US00RE36012E

United States Patent [19]

Loomis et al.

[11] E Patent Number: Re. 36,012

[45] Reissued Date of Patent: Dec. 29, 1998

[54] ACCELERATOR-BASED METHODS AND APPARATUS FOR MEASUREMENT-WHILE-DRILLING

[75] Inventors: William A. Loomis, Ridgefield, Conn.; Kenneth E. Stephenson, Cambridge, England; Jerome A. Truax, Brookfield, Conn.; Wolfgang P. Ziegler, Ridgefield, Conn.; S. Zema Chowdhuri, Bloomington, Ind.; Benoit Couet, Bethel, Conn.; Michael L. Evans, Missouri City, Tex.; Paul Albats; Bradley A. Roscoe, both of Ridgefield, Conn.; Jacques M. Holenka, Missouri City, Tex.; Keith A. Moriarty, Houston, Tex.; William R. Sloan, Missouri City, Tex.

[73] Assignee: Schlumberger Technology Corporation, Ridgefield, Conn.

[21] Appl. No.: 710,997

[22] Filed: Sep. 25, 1996

Related U.S. Patent Documents

Reissue of:

[64] Patent No.: 5,539,225
Issued: Jul. 23, 1996
Appl. No.: 307,894
Filed: Sep. 16, 1994

[51] Int. Cl.[6] ..... G01V 5/10

[52] U.S. Cl. ..... 250/269.4; 250/269.5

[58] Field of Search ..... 250/269.4, 269.1, 250/269.5, 269.6

[56] References Cited

U.S. PATENT DOCUMENTS

| | | | |
|---|---|---|---|
| 4,501,964 | 2/1985 | Arnold | 250/270 |
| 4,596,926 | 6/1986 | Coope | 250/265 |
| 4,661,700 | 4/1987 | Holenka | 250/267 |
| 4,698,501 | 10/1987 | Paske | 250/265 |
| 4,705,944 | 11/1987 | Coope | 250/254 |
| 4,760,252 | 7/1988 | Albats et al. | 250/269 |
| 4,814,609 | 3/1989 | Wraight et al. | 250/254 |
| 4,879,463 | 11/1989 | Wraight et al. | 250/270 |
| 4,883,956 | 11/1989 | Melcher et al. | 250/269 |
| 4,972,082 | 11/1990 | Loomis et al. | 250/269 |
| 5,051,581 | 9/1991 | Hertzog et al. | 250/266 |
| 5,091,644 | 2/1992 | Minette | 250/254 |
| 5,235,185 | 8/1993 | Albats et al. | 250/269 |
| 5,235,285 | 8/1993 | Clark et al. | 324/342 |
| 5,397,893 | 3/1995 | Minette | 250/254 |

OTHER PUBLICATIONS

Ellis, Darwin V., "Well Logging for Earth Scientists", *Elsevier Science Publishing Co.*, Inc., pp. 204–212, 418, 425.

Richard Odom et al., "A New 1.625" Diameter Pulsed Neutron Capture and Inelastic/Capture Spectral Combination System Provides Answers in Complex Reservoirs, Paper O, *Transactions of the SPWLA 35th Annual Logging Symposium*, Jun. 19–22, 1994.

"Advances in Openhole Well Logging" by R. D. Felder, SPE, Exxon Exploration Co., Aug. 1994 JPT, pp. 693–701.

*Primary Examiner*—Edward P. Westin
*Assistant Examiner*—Richard Hanig
*Attorney, Agent, or Firm*—Brigitte L. Jeffery; David Garrod; Keith Smith

[57] ABSTRACT

Measurement-while-drilling apparatus includes a 14 MeV neutron accelerator, a near-spaced neutron detector which primarily senses source neutrons and whose output is proportional to source strength, one or more intermediately-spaced epithermal neutron detectors eccentered against the drill collar wall and primarily responsive to formation hydrogen concentration, and a third far-spaced radiation detector, either gamma ray or neutron, primarily responsive to formation density. The intermediately-spaced and far-spaced detector outputs, normalized by the near-spaced detector output, are combined to provide measurements of porosity, density and lithology and to detect gas. A thermal neutron detector and/or a gamma ray detector may also be provided at intermediate spacings to provide additional information of interest, such as standoff measurements and spectral analysis of formation composition. Tool outputs are related to the angular or azimuthal orientation of the measurement apparatus in the borehole.

96 Claims, 11 Drawing Sheets

ACCELERATOR-BASED METHODS AND APPARATUS FOR MEASUREMENT-WHILE-DRILLING

Matter enclosed in heavy brackets [ ] appears in the original patent but forms no part of this reissue specification; matter printed in italics indicates the additions made by reissue.

DESCRIPTION

1. Field of the Invention

The present invention relates generally to the investigation of subsurface earth formations contemporaneously with the drilling of a borehole therethrough and, more specifically, to methods and apparatus for making neutron-accelerator based measurements while drilling. In their broadest aspects, certain of the techniques disclosed also relate to wireline logging as well.

2. Background of the Invention

The measurement of the porosities of subsurface earth formations surrounding a well borehole by means of the attenuation of neutron flux with distance from the neutron source is well known in wireline logging. Epithermal logging tools, in particular, are sensitive to the hydrogen density or concentration in a formation. As hydrogen is generally found in formation fluids, hydrogen concentration is related to the amount of pore space, and thus the porosity, of the formation. For a given porosity, however, an increase in matrix density (keeping the same matrix chemical composition) can cause an epithermal neutron detector count rate (for a source-to-detector spacing of 60 cm for example) to decrease. This change in count rate is in the same direction as would occur if the porosity increased for a given matrix density. Thus a neutron porosity measurement by itself cannot unambiguously determine the porosity of a formation of unknown composition.

It is conventional in wireline logging, therefore, to make bulk density measurements of a formation of interest by running a second tool, based on Compton scattering of gamma rays from electrons, over the same depth interval as the neutron porosity tool. An increase in matrix density also causes a decrease in the detector count rate in the density tool. On the other hand, if the porosity increases for a given matrix density, the density tool detector count rate increases. Changes in matrix density and porosity thus have complimentary effects on neutron porosity and Compton-scattering density tools, which effects can be offset by cross plotting the responses of the two tools. By use of such cross plots, the physics can be untangled and changes in matrix density and composition (lithology) can be determined. Because the inclusion of gas in the matrix pore spaces also affects the neutron porosity and density tool responses, it is possible in certain circumstances to detect the presence of gas by means of neutron/density cross plots.

Although such wireline porosity and density logging tools afford much useful information concerning subsurface formations, they are necessarily employed only after the borehole has been drilled and the drill string has been removed, which may be hours or even days after the borehole has been formed. As a result, the formations and the borehole may have undergone changes that mask or obscure important petrophysical properties under investigation. For example, both the invasion of drilling fluid into the formation and the build-up of mudcake on the borehole wall can adversely affect many logging measurements, including both the gamma ray bulk density measurement and the neutron porosity measurement. Both measurements are also affected by mudcake density, as well as by any sloughing or caving of the borehole wall that might have occurred. Further disadvantages of wireline tools include the loss of drilling time and the expense and delay of tripping the drill string so as to enable the wireline tool to be lowered into the borehole. It would be quite advantageous, therefore, if the density and neutron porosity measurements, as well as other measurements of interest, could be made during the drilling operation itself.

Efforts have been made in the prior art to provide nuclear (gamma ray density or neutron porosity) formation evaluation while drilling; see, for example, U.S. Pat. No. 4,596,926, U.S. Pat. No. 4,698,501, U.S. Pat. No. 4,705,944, U.S. Pat. No. 4,879,463 and U.S. Pat. No. 4,814,609. The conventional bulk density measurement technique, however, requires a source of gamma rays, typically a $^{137}Cs$ isotopic source. The conventional neutron porosity measurement technique likewise employs an isotopic chemical source, such as AmBe. Such radioactive chemical sources have obvious disadvantages from a radiation safety viewpoint. This is of particular concern in measurement-while-drilling applications, where operating conditions make both the loss of a source more likely and its retrieval more difficult than in wireline operations. Indeed, the aforementioned measurement-while-drilling prior art patents have focused in substantial part on preventing the loss or, if lost, the recovery of such chemical sources.

Although accelerator-based wireline porosity tools have recently been developed, see, for example, U.S. Pat. No. 4,760,252 to Albats et al., such tools are not directly transposable to measurement-while-drilling applications because of the perturbing effects on the tool responses of the large amounts of steel and drilling fluid present in those applications. Moreover, there currently is no practical and economical accelerator-based alternative to the $^{137}Cs$ gamma ray source for density logging. A need exists, therefore, for an accelerator-based measurement-while-drilling tool which would eliminate the requirement for the radioactive chemical sources of conventional neutron porosity and bulk density tools.

SUMMARY OF THE INVENTION

The foregoing and other requirements of the prior art are met, in accordance with the invention, by the provision of measurement-while-drilling apparatus and methods which include a high-energy (preferably 14 MeV) neutron accelerator in a drill collar section of a drill string and at least one radiation (neutron or gamma ray) detector spaced from the accelerator for measuring the radiation resulting from the neutron irradiation of the surrounding earth formations. In a preferred embodiment, a near-spaced neutron detector for monitoring neutron source flux, an intermediately-spaced epithermal neutron detector that is primarily responsive to formation hydrogen concentration and a far-spaced detector that is more responsive to formation density than is the epithermal neutron detector are provided in the drill collar. The near-detector output is used to normalize the other detector outputs for source strength fluctuation. The normalized intermediately-spaced epithermal neutron detector output and the normalized far-spaced detector output are combined, in a manner conceptually similar to the conventional neutron porosity-density cross plot, to obtain measurements of formation porosity, bulk density and lithology and/or to detect gas. The measurements are made and recorded as a function of borehole depth and angular or azimuthal orientation in the borehole.

The near-spaced detector is preferably an epithermal neutron detector shielded by a neutron moderating-absorbing material to be substantially insensitive to formation-origin neutrons. Alternatively, it may comprise an MeV neutron detector, such as a $^4$He detector or a liquid scintillator neutron detector, shielded by a high-Z material. The intermediately-spaced epithermal neutron detector may be one of a number of similarly spaced detectors forming a detector array. The array may include a plurality of like epithermal detectors spaced circumferentially about the inner wall of the drill collar to provide enhanced horizontal resolution. One or more gamma ray detectors and/or thermal neutron detectors may also be included in the array. If desired, the array detectors may be vertically spaced for improved vertical resolution. The far-spaced detector is preferably a gamma ray detector, but also may comprise a high-energy (>0.5 MeV) neutron detector, e.g., a $^4$He or liquid scintillator detector. Alternatively, both a far-spaced gamma ray and a far-spaced neutron detector may be provided. Where a liquid scintillator is used, it could be configured to detect both neutrons and gamma rays.

The neutron accelerator and the near-spaced detector are preferably coaxially aligned and eccentered to one side of the drill collar to accommodate the drilling fluid channel on the other side of the drill collar. To enhance sensitivity to the formation, the array detectors are preferably eccentered against the inner wall of the drill collar and back-shielded against borehole and drill collar-transported neutrons. The far-spaced detector(s) is preferably coaxial with the accelerator and the near-spaced detector. It, too, is shielded against neutrons streaming along the borehole and the drill collar.

A neutron transparent window is preferably provided opposite each neutron detector in the array to further enhance formation sensitivity and to increase the depth of investigation. A preferred construction of the neutron windows includes a low-scattering cross section material, such as titanium, sheathed in boron or other neutron-absorbing material to minimize neutron leakage into the drill collar. An external neutron-absorbing layer, formed with openings at the locations of the neutron windows, may also be provided to further reduce neutron flow into the drill collar. As an alternative neutron window construction, transverse and/or longitudinal layers of neutron-absorbing material may be provided in the drill collar to attenuate longitudinal and/or circumferential neutron flow therein.

In addition to the aforementioned cross plot technique, the intermediately-spaced detector outputs and the far-spaced detector output may also be separately processed, if desired, to obtain other information of interest. For example, measurements of porosity and standoff may be derived from the slowing down time curve generated by the array epithermal neutron detector(s) and information as to the chemical composition of the formation may be obtained from a spectral analysis of gamma ray energy spectra recorded at the array gamma ray detector. Such a spectral analysis may alternatively be based on the output of the far-spaced detector where that detector detects gamma rays. The thermal neutron detector output is useful in determining the formation macroscopic capture cross section and in measuring standoff. The thermal neutron macroscopic capture cross section, or its correlative the thermal neutron decay time constant, may also be determined from the gamma ray detector output. These additional measurements are useful alone or in interpreting the basic cross plot presentation.

BRIEF DESCRIPTION OF THE DRAWINGS

The objects, features and advantages of the invention may be further understood from the following description of representative embodiments thereof, taken in conjunction with the accompanying drawings, in which.

DETAILED DESCRIPTION

Figure 1:
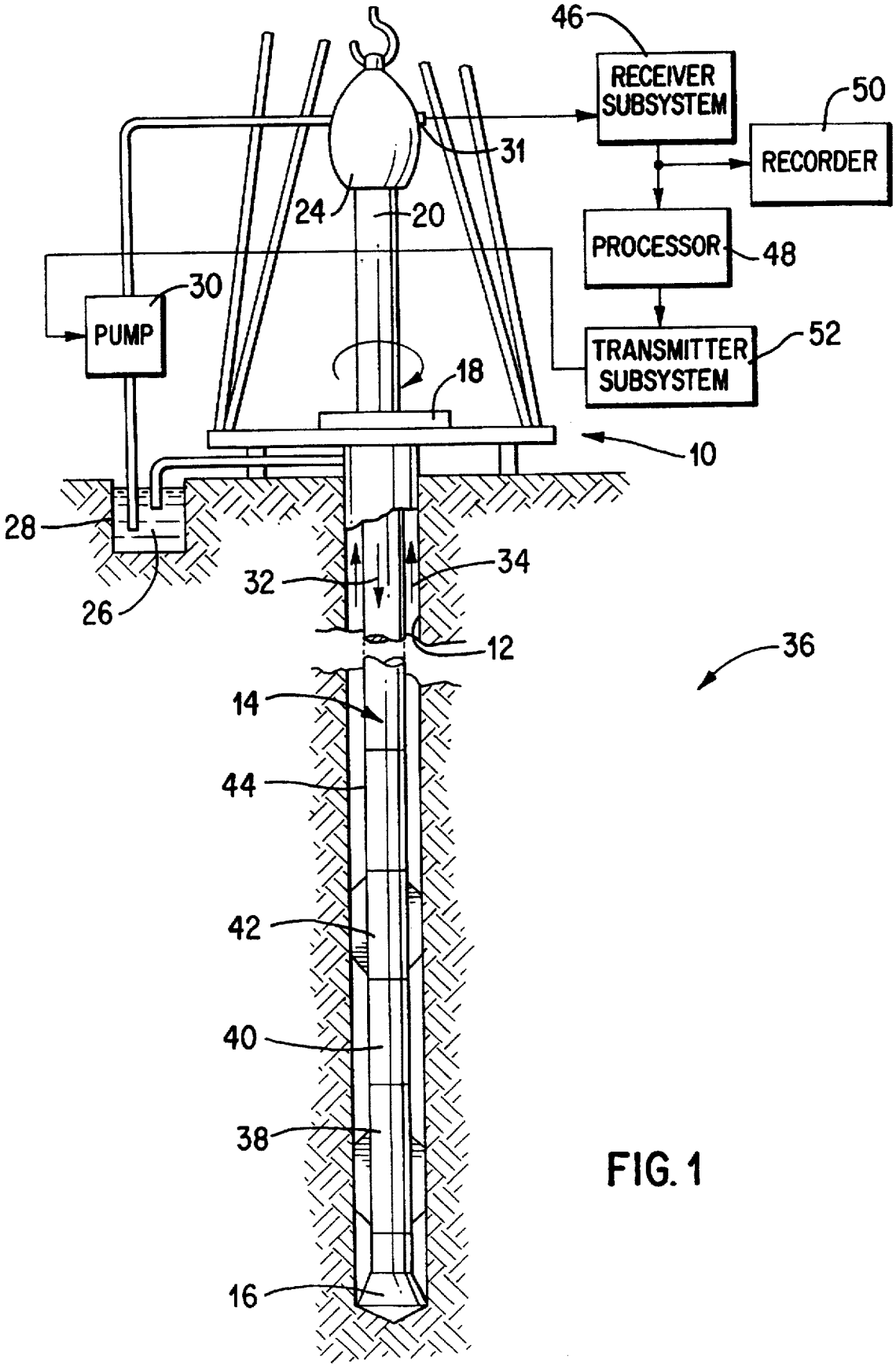
FIG. 1 is a schematic diagram, partly in block form, of one embodiment of a measurement-while-drilling apparatus constructed in accordance with the invention and including a drill string suspended from a rotary drilling platform.

The present invention has particular utility in measurement-while-drilling applications, and such an application is illustrated in FIG. 1 of the drawings. In that regard, and unless otherwise specified, measurement-while-drilling (also known as measuring-while-drilling and logging-while-drilling) as used herein is intended to include the recording of data and/or the making of measurements in an earth borehole, with the drill bit and at least some of the drill string in the borehole, during drilling, pausing and/or tripping. It will be understood, however, that certain aspects of the invention will have application to wireline logging as well.

As shown in FIG. 1, a platform and derrick 10 are positioned over a borehole 12 that is formed in the earth by rotary drilling. A drill string 14 is suspended within the borehole and includes a drill bit 16 at its lower end. The drill string 14 and the drill bit 16 attached thereto are rotated by a rotating table 18 (energized by means not shown) which engages a kelly 20 at the upper end of the drill string. The drill string is suspended from a hook 22 attached to a travelling block (not shown). The kelly is connected to the hook through a rotary swivel 24 which permits rotation of the drill string relative to the hook. Alternatively, the drill string 14 and drill bit 16 may be rotated from the surface by a "top drive" type of drilling rig.

Drilling fluid or mud 26 is contained in a mud pit 28 adjacent to the derrick 10. A pump 30 pumps the drilling fluid into the drill string via a port in the swivel 24 to flow downward (as indicated by the flow arrow 32) through the center of drill string 14. The drilling fluid exits the drill string via ports in the drill bit 16 and then circulates upward in the annulus between the outside of the drill string and the periphery of the borehole, as indicated by the flow arrows 34. The drilling fluid thereby lubricates the bit and carries formation cuttings to the surface of the earth. At the surface, the drilling fluid is returned to the mud pit 28 for recirculation. If desired, a directional drilling assembly (not shown) with a mud motor having a bent housing or an offset sub could also be employed.

Mounted within the drill string 14, preferably near the drill bit 16, is a bottom hole assembly (indicated generally by the reference numeral 36), which includes subassemblies for making measurements, processing and storing information and for communicating with the earth's surface. Preferably, the bottom hole assembly is located within several drill collar lengths of the drill bit 16. In the illustrated bottom hole arrangement of FIG. 1, a stabilizer collar section 38 is shown immediately above the drill bit 16, followed in the upward direction by a drill collar section 40, another stabilizer collar section 42 and another drill collar section 44. This arrangement of drill collars and stabilizer collars is illustrative only, and other arrangements may of course be used. The need for or desirability of the stabilizer collars will depend on drilling conditions.

In the embodiment shown in FIG. 1, the components of the downhole measurement subassembly are preferably located in the drill collar section 40 above the stabilizer collar 38. Such components could, if desired, be located closer to or farther from the drill bit 16, such as, for example, in either stabilizer collar section 38 or 42 or the drill collar section 44.

The bottom hole assembly 36 also includes a telemetry subassembly (not shown) for data and control communication with the earth's surface. Such apparatus may be of any suitable type, e.g., a mud pulse (pressure or acoustic) telemetry system as disclosed in U.S. Pat. No. 5,235,285 (hereby incorporated by reference), which receives output signals from the data measuring sensors and transmits encoded signals representative of such outputs to the surface where the signals are detected, decoded in a receiver subsystem 46 and applied to a processor 48 and/or a recorder 50. The processor 48 may comprise any suitably programmed digital or analog computer, and the recorder 50 preferably comprises a conventional recorder-plotter for making the usual visual and/or magnetic data record as a function of borehole depth. A surface transmitter subsystem 52 may also be provided for establishing downward communication with the bottom hole assembly 36, as disclosed, for example, in the aforementioned U.S. Pat. No. 5,235,285.

The bottom hole assembly 36 preferably also includes conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. Alternatively, the data may be stored downhole and retrieved at the surface upon removal of the drill string. Suitable downhole circuitry for these purposes is described in U.S. Pat. No. 4,972,082 and U.S. Pat. No. 5,051,581, the disclosures of which are hereby incorporated by reference. To facilitate electrical connections and signal transmission between the measurement subassembly, the data acquisition and processing subassembly, and the data telemetry subassembly, these components are preferably located adjacent to each other in the drill string. Where this is not feasible, the data communications system of the aforementioned U.S. Pat. No. 5,235,285, which provides for both local downhole communication over short distances and downhole-to-surface communication, may be utilized. Power for the downhole electronics may be provided by battery or, as known in the art, by a downhole turbine generator powered by the drilling fluid.

Figure 2:
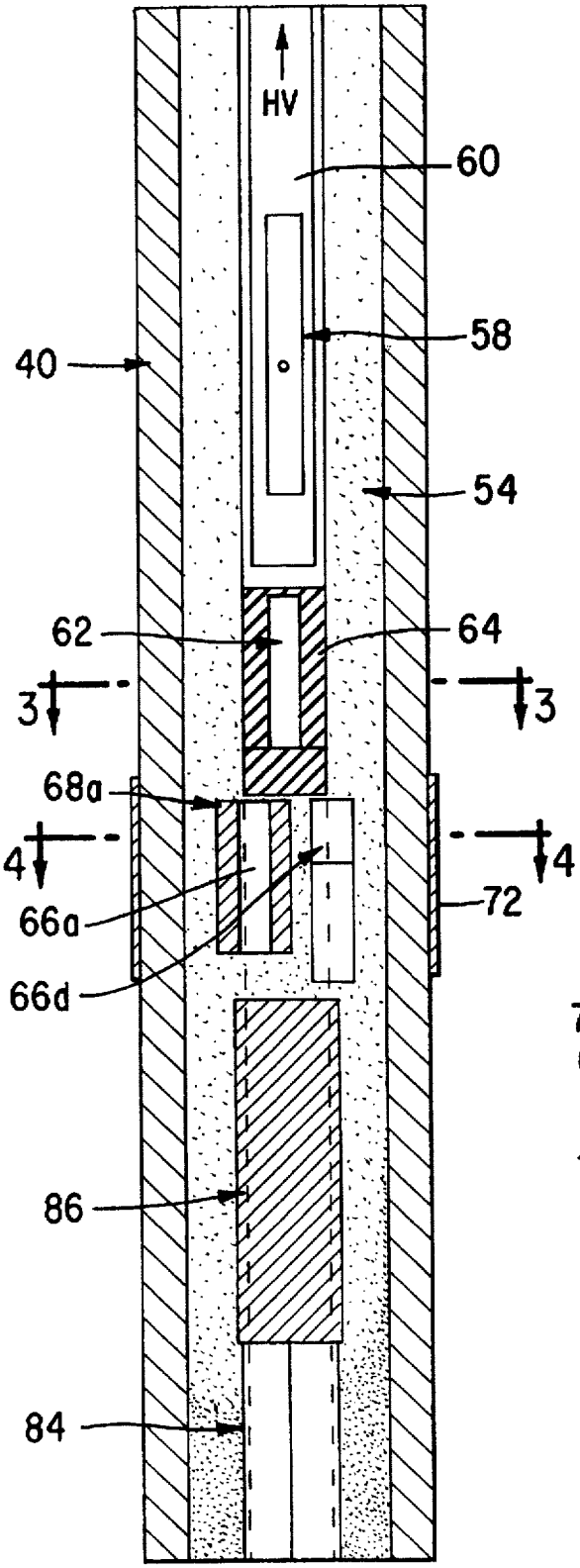
FIG. 2 is a vertical cross-sectional view, partly in schematic form, of one embodiment of the downhole measurement subassembly including the neutron accelerator and associated radiation detectors.
Figure 3:
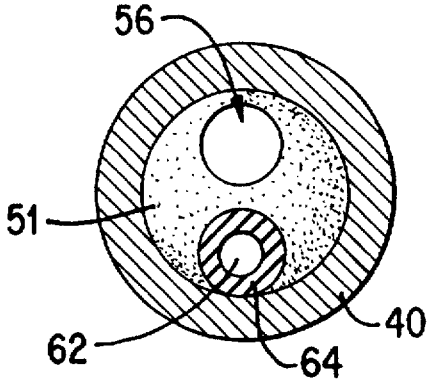
FIG. 3 is a horizontal cross-sectional view taken along the line 3—3 in FIG. 2, showing the preferred location of the near-spaced detector relative to the drill collar.
Figure 4:
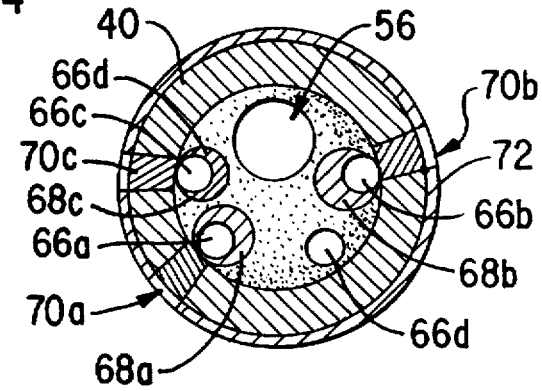
FIG. 4 is a horizontal cross-sectional view taken along the line 4—4 in FIG. 2, showing one configuration of the array detectors and the associated neutron windows relative to the drill collar.

A preferred embodiment of the downhole measurement subassembly is shown in FIGS. 2–4, where the drill collar section 40 is shown as surrounding a stainless steel tool chassis 54. The drill collar may be of any suitable size, e.g. having an 8" OD with a 5" ID. Formed in the chassis 54 to one side of the longitudinal axis thereof, as best seen in FIGS. 3 and 4, is a longitudinally extending mud channel 56 for conveying the drilling fluid downward through the drill string. Eccentered to the other side of the chassis 54 are a neutron accelerator 58, its associated control and high voltage electronics package 60 and a coaxially aligned, near-spaced detector 62. The accelerator is preferably a D-T type (14 MeV) source as is known in the art.

In accordance with the invention, the near-spaced detector 62 should be primarily responsive to accelerator output with minimum formation influence. To that end, the detector 62 may comprise an epithermal neutron detector, e.g., a $^3$He proportional counter, which is located close to the accelerator without intervening high density shielding. The sensitive volume of the detector 62 is clad in cadmium or other high thermal neutron capture cross section material (not shown) to raise the detection threshold to epithermal levels. The detector 62 is also surrounded, preferably on all surfaces except that adjacent to the accelerator 58, by a shield 64 of combined neutron moderating-neutron absorbing material, such as boron carbide (or other 1/v type absorber) distributed in an epoxy (or other hydrogenous material) binder ("B4CE"). More detailed information concerning the structure and function of the shielding for such a near-spaced $^3$He detector is set out in U.S Pat. No. 4,760,252, the pertinent portions of which are hereby incorporated by reference.

Alternatively, the near detector 62 may be a higher energy (MeV) detector, such as a $^4$He detector, surrounded by tungsten, heavimet or other high-Z shielding to both shield the detector from the formation and multiply the number of non-formation neutrons incident upon the detector. The multiplying effect is due to the large (n, 2n) and (n, 3n) cross section of the high-Z material, which converts 14 MeV source neutrons into two or three neutrons below approximately 6 MeV, where the $^4$He scattering cross section is large. Thus, the high-Z shielding not only decreases the sensitivity of the near-detector signal to formation scattered neutrons, it also effectively attenuates the source (14 MeV) neutron flux along the tool.

If, as described below, the farther-spaced neutron detectors are shielded in a B4CE (or like moderating-absorbing) material, the slowing down power of the hydrogen in the B4CE can be used to further reduce the energy of the neutrons while the absorbing power of the boron serves to attenuate the low energy neutron flux. The ordering of the shielding materials, high-Z material near the neutron source and the B4CE (or like) material following, is critical, as the reverse order is ineffective to shield high energy neutrons.

Whether the near-spaced detector 62 is an eV detector or an MeV detector, the combined effect of the detection energy, placement and shielding of the near detector should be such as to render the detector output relatively insensitive to formation porosity and primarily proportional to the neutron flux from the accelerator. The output of the near detector 62 may then be used to normalize other detector outputs for source strength fluctuation.

Located longitudinally adjacent to the near-spaced detector 62 is a plurality or array of detectors 66a, 66b, 66c and 66d. The array includes at least one, and preferably more than one, epithermal neutron detector and at least one gamma ray detector. One or more thermal neutron detectors may optionally be included. As illustratively depicted in FIG. 4, there are two epithermal detectors 66a and 66b, one thermal neutron detector 66c and one gamma ray detector 66d. A different number or mix of detectors may be provided if desired.

The principal purpose of the epithermal neutron detectors 66a, 66b is to measure the epithermal neutron flux in the formation at a spacing sufficiently close to the neutron source to minimize, or at least significantly reduce, the effect on the detector outputs of the heavier formation elements, such as oxygen, silicon, carbon, calcium, etc., which dominate bulk density, and to maximize, or at least significantly enhance, the influence of formation hydrogen on the detector outputs. So positioned, the epithermal neutron detector response will depend primarily on the hydrogen index with only a residual lithology effect. To enhance sensitivity to the formation, the epithermal detectors 66a, 66b, which may be $^3$He proportional counters, are preferably located closely adjacent the drill collar wall and back-shielded, as shown at 68a and 68b, to reduce borehole neutron sensitivity. The shielding material is preferably the same as that described previously in connection with the near detector 62, i.e. cadmium cladding and B4CE. As described more fully below, neutron-transparent windows 70a and 70b are preferably formed in the drill collar to further enhance detector sensitivity and to provide a greater depth of investigation.

As illustrated in FIG. 4, the epithermal neutron detectors 66a, 66b and the associated windows 70a, 70b are preferably spaced apart circumferentially of the drill collar 40 for enhanced angular or azimuthal resolution. Any desired circumferential spacing of the detectors may be used. Although the detectors 66a, 66b are shown at the same longitudinal spacing from the accelerator 58, one or more additional detectors could be provided at different longitudinal spacings for enhanced vertical resolution. Circumferentially and horizontally spaced detector arrays, as well as further details concerning the configuration of the individual detectors and their shielding, are described in more detail in U.S. Pat. No. 4,760,252 and U.S. Pat. No. 4,972,082, which are hereby incorporated by reference. The high spatial resolution of the slowing down time measurement, as described in the '082 patent, makes the azimuthal measurement of slowing down time in accordance with the present invention of particular interest and value.

It is to be noted that the source/detector spacings described in U.S. Pat. No. 4,760,252 and U.S. Pat. No. 4,972,082 are for wireline tools. Somewhat longer spacings should be provided in a measurement-while-drilling tool to account for the fact that the detectors are looking at the formation through the drill collar.

The thermal neutron detector 66c may likewise be a $^3$He proportional counter shielded, as at 68c, similarly to the epithermal detectors 66a, 66b, except that the cadmium cladding is omitted on the formation side to render the detector sensitive to formation thermal neutrons. A neutron transparent window 70c may be provided in the drill collar 44 adjacent to the thermal detector 66c. Additional thermal neutron detectors may be provided as needed to obtain the desired horizontal and/or vertical resolution. The output signals from the thermal neutron detector(s) 66c may be processed as described in the incorporated portions of U.S. Pat. No. 4,760,252 to derive a thermal neutron porosity measurement and/or in accordance with the disclosure of U.S. Pat. No. 5,235,185, hereby incorporated by reference, to derive measurements of formation sigma and standoff.

The gamma ray detector 66d may comprise any suitable type detector, such as NaI, BGO, CsI, anthracene, etc., but preferably is a cerium-activated gadolinium orthosilicate (GSO) detector as disclosed in U.S. Pats. No. 4,647,781 and U.S. Pat. No. 4,883,956, both of which are hereby incorporated by reference. As disclosed in those patents, the GSO detector is preferably surrounded by boron to reduce the influence of thermal and epithermal neutrons on the detector response. Also, a tungsten or other high density shield (not shown) may be placed between the accelerator 58 and the GSO detector 66d to reduce the flux of high energy neutrons incident on the detector.

Although not shown, it will be understood that appropriate timing and control circuitry will be provided to operate the accelerator 58 in a pulsed mode and to gate the detector 66d as needed selectively to detect inelastic and/or capture gamma rays. The energy detection range is preferably broad, e.g. from 0.1 to 11 MeV. A principal purpose of the detector 66d is to provide inelastic and/or capture gamma ray energy spectra and energy window count rates. In particular, the energy spectra can be spectrally analyzed to derive information concerning the elemental composition of the formations under investigation. The preferred technique for analyzing the spectral data from the gamma ray detector 66d to obtain the elemental spectroscopy and lithology information is described in the copending, commonly-owned U.S. patent application Ser. No. 08/221,158 for "Methods and Apparatus for Determining Formation Lithology by Gamma Ray Spectroscopy", filed on Mar. 31, 1994 by B. A. Roscoe. The disclosure of the Roscoe application is hereby incorporated by reference.

Briefly, in accordance with the Roscoe disclosure, inelastic scattering gamma ray spectra are analyzed by a least squares spectral fitting process to determine the relative elemental contributions thereto of chemical elements postulated to be present in an unknown earth formation and contributing to the measured spectra from the formation. The relative inelastic yields for silicon, calcium and magnesium are calibrated to provide straightforward estimates of the respective elemental concentrations for those elements and of the volumetric fractions of the elements or associated rock types, such as sandstone, limestone and dolomite, in the formation. The ratio of the relative inelastic yields for magnesium and calcium provides an indication of the degree of dolomitization of a formation. Based on the calibrated inelastic yields for silicon and/or calcium, calibrated estimates of the elemental yields from measured thermal neutron capture gamma ray spectra may also be determined, from which further information concerning formation lithology may be derived.

Measurements of the epithermal neutron slowing down time and tool standoff from the borehole wall may be derived from the outputs of the epithermal neutron detectors 66a, 66b. Because the large amount of steel present in the drill collar 40 and chassis 54 acts as a long lifetime storage sink for neutrons, the sensitivity of the detectors 66a, 66b to epithermal neutron slowing down time is substantially reduced. To measure epithermal neutron slowing down time while drilling, therefore, it is important to properly locate the detectors 66a, 66b relative to the drill collar 40, to provide properly constructed neutron windows 70a, 70b and to properly back-shield the detectors 66a, 66b. As shown in FIG. 4 and as noted above, the sensitive volumes of the detectors 66a, 66b are preferably mounted in the tool chassis 54 closely adjacent the inner wall of the drill collar 40 and immediately opposite the respective neutron windows 70a, 70b in the drill collar. Each detector is also preferably back-shielded (with B4CE or the like) on both ends and on all sides except the side facing the drill collar. The windows 70a, 70b are preferably made of titanium or other high-strength, low-scattering cross section material which is sheathed in boron. To further reduce neutron entry into the drill collar 40, a boron carbide layer 72 with holes to match the locations of the windows 70a, 70b is preferably provided on the exterior of the drill collar 40 in the region of the detectors. Modelling and experimental data have shown that the sensitivity of the epithermal neutron slowing down time curves to porosity from detectors positioned, shielded and windowed in this way is greater than for detectors without windows or external boron shielding.

Figure 5:
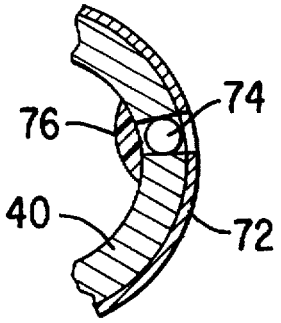
FIG. 5 is a partial horizontal cross-sectional view, showing another configuration of an array epithermal neutron detector and its associated neutron window.

As alternatively shown in FIG. 5, it is possible to enhance detector sensitivity still further by placing the detectors 74 in the drill collar 40 itself, with boron carbide back-shielding 76 and an external boron carbide layer 72 with matching holes as in FIG. 4. This combination, though feasible, exposes the detectors to greater risk of damage during drilling and also requires machining of the drill collar to form the detector receptacles.

Figure 6:
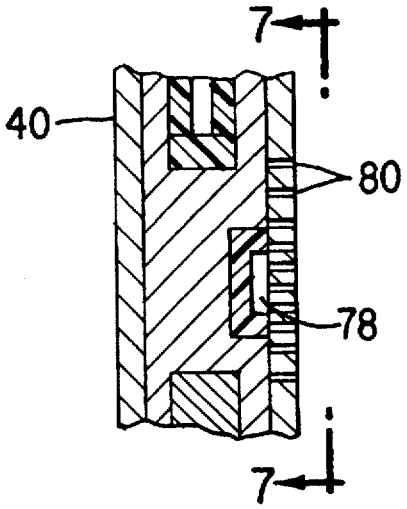
FIG. 6 is a partial vertical cross-sectional view of another embodiment of the downhole measurement subassembly, showing an alternative embodiment of a neutron window.
Figure 7:
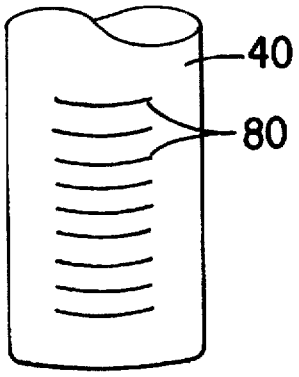
FIG. 7 is an external view taken along the line 7—7 in FIG. 6, showing the external configuration of the neutron window of FIG. 6.
Figure 8:
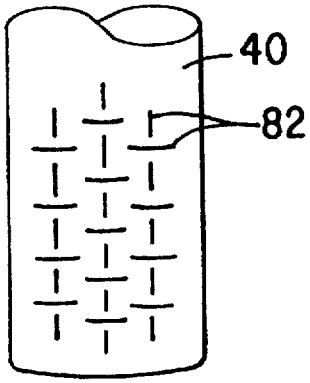
FIG. 8 is an external view similar to FIG. 7, showing the external configuration of another embodiment of a neutron window.

As an alternative to the use of boron-sheathed neutron transparent windows 70a, 70b, as shown in FIG. 4, the slowing down time and count rate sensitivity of the epithermal neutron detectors 66a, 66b can be enhanced by providing transverse layers of boron or other high-absorption cross section material in the drill collar 40 in the region of the epithermal neutron detectors. This is illustrated in FIGS. 6–8. FIG. 6 depicts an epithermal neutron detector 78 eccentered against the drill collar wall and back-shielded as in FIG. 4. A plurality of transverse boron carbide layers 80 are embedded in the collar wall, where they act as a "venetian blind" to permit neutron travel transversely across the collar to the detector while blocking neutron flow along the collar. FIG. 7 illustrates the external pattern of boron carbide layers 80 of FIG. 6. An alternative pattern of boron carbide layers 82 is shown in FIG. 8. This pattern serves to minimize neutron flow through the collar in both longitudinal and circumferential directions without interfering with transverse flow. The boron carbide layers 80 and 82, therefore, function essentially as a neutron window for the epithermal or thermal neutron detectors.

The use of neutron absorbing layers as shown in FIGS. 6–8 has been found to be particularly important for reducing neutron flow in low scattering cross section material, such as titanium, which is desirable as a drill collar material in measurement-while-drilling applications because of its relative transparency to neutrons but which, because of its lower density, does not attenuate the component of neutron transport parallel to or circumferentially of the drill collar to the same extent as does steel. For further effectiveness, the boron carbide layers could also be included in the tool chassis 54 on the accelerator side, or on both sides, of the neutron detectors.

With reference again to the overall measurement subassembly configuration shown in FIG. 2, a far-spaced detector 84 is located downstream of the array detectors 66a–66d with an intervening neutron shield 86. The detector 84 and shield 86 are preferably coaxial with the accelerator 58. In accordance with the invention, the far-spaced detector 84 is selectively positioned relative to the neutron source so as to be sensitive to MeV energy neutrons (or, preferably, MeV neutron-induced gamma rays) that penetrate to relatively far distances in the formation. As the transport of MeV energy neutrons has reduced sensitivity to formation hydrogen content and enhanced sensitivity to the density of heavier formation elements, as compared to KeV-ev energy neutrons, the response of the detector 84 will be strongly influenced by formation bulk density and, because of the close relation between density and matrix type, formation lithology.

Preferably, the detector 84 comprises a GSO gamma ray detector as described in the aforementioned U.S. Pats. No. 4,647,782 and U.S. Pat. No. 4,883,956, although any suitable type, such as anthracene, NaI, BGO, CsI, etc., may be used so long as acceptable count rate statistics and energy resolution are achieved. The preferred energy detection range is from 0.1 MeV to 11 MeV. Alternatively, a neutron detector sensitive to MeV range neutrons, e.g. >0.5 MeV., may be used. The preferred neutron detectors are a $^4$He type or a liquid scintillator type.

Where a gamma ray detector is employed as the far-spaced detector 84, the intervening shield 86 is preferably B4CE or like neutron moderating-absorbing material. If an MeV neutron detector is used, the shield 86 is preferably a high-Z material such as tungsten, except where the near-spaced detector 62 is also a $^4$He (or other MeV detector) shielded by high-Z material. In the latter case, the shielding 86 should also be B4CE or the like to take full advantage of the aforementioned neutron moderating effect of the high-Z shielding material 64 surrounding the near-spaced detector 62.

Although the far-spaced detector 84 may be either a gamma ray detector or an MeV neutron detector, a gamma ray detector is preferred because gamma rays have better sensitivity to gas than do neutrons in some situations, thereby facilitating the identification of gas-bearing formations. Also, as described above in connection with the array gamma ray detector 66d, the use of a gamma ray detector permits a spectral analysis to be made to obtain information of the elemental composition and lithology of the formation. Such a spectral analysis may be made at both, or only one, of the array detector 66d and the far-spaced detector 84. The output of either (or both) gamma ray detector could additionally be employed to derive measurements of the formation macroscopic capture cross section for thermal neutrons ($\Sigma$) or its correlative the thermal neutron decay time constant ($\tau$). Any of the known techniques for deriving $\Sigma$ or $\tau$ may be used for this purpose. Also, where the far-spaced detector 84 is a gamma ray detector, the array gamma ray detector could be omitted if space or other considerations dictate.

A second far-spaced detector (not shown) may be provided if desired. If so, it preferably is located coaxially with and closely adjacent to the detector 84. If the detector 84 is a gamma ray detector, the second far-spaced detector is preferably a neutron detector and vice versa.

Although not specifically shown, it will be understood that the above-described detectors include all amplification, pulse shaping, power supply and other circuitry required to generate output signals representative of the radiation detected. All such circuitry is well known in the art.

The signals from the several detectors provided in the tool may be processed in various ways to obtain the desired petrophysical information. As mentioned, the output of the near-spaced detector 62 is proportional to the neutron source output and is used principally to normalize the other detector output signals for source strength fluctuation.

The outputs of the array epithermal neutron detectors 66a, 66b are mostly sensitive to hydrogen index, and thus porosity, and, according to one feature of the invention, are used in combination with the output of the far-spaced detector 84 to derive information as to formation density, porosity and lithology and to detect gas. The basic signal processing solution uses the neutron flux A1 (count rate from detector 66a or 66b) normalized by the count rate N1 from the near-spaced detector 62, i.e., $(A1/\hat{N1})(-1)$, and the similarly normalized inverse count rates $(F1g/\hat{N1})(-1)$ or $(F1n/\hat{N1})(-1)$ from the far-spaced gamma ray or MeV neutron detector 84, respectively. As will be described, these quantities may be used in several ways to determine the hydrogen index HI, the slowing down lengths (eV or MeV) and the lithology of the formation. As a further feature of the invention, the slowing down lengths and the hydrogen index may be used to derive the bulk density of the formation Finally, the determination of bulk density may be improved by lithological information obtained from the near gamma spectroscopy detector 66d.

Figure 9:
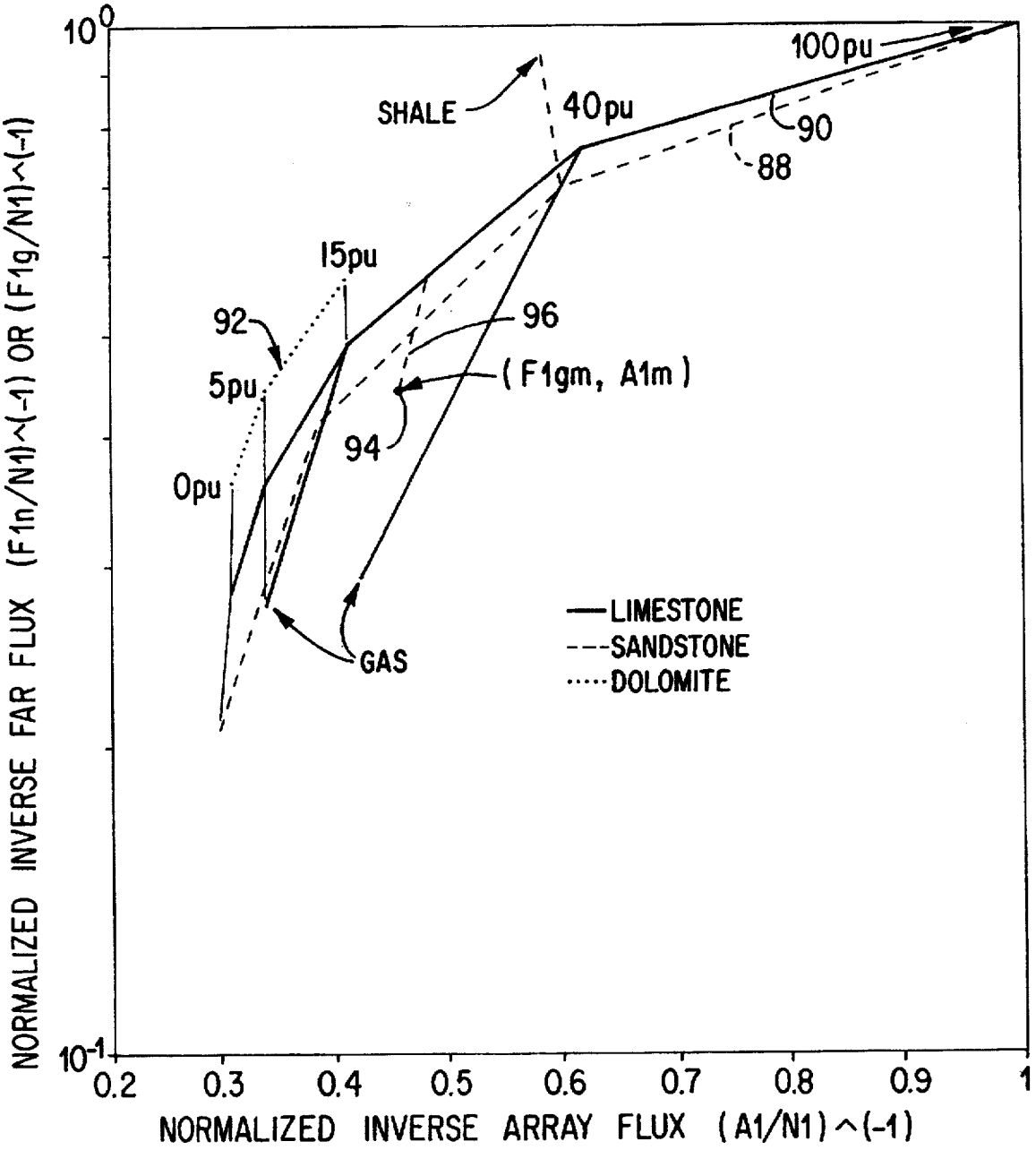
FIG. 9 is a cross plot of the inverse normalized flux for a near-spaced epithermal neutron detector vs. the normalized inverse flux for a far-spaced gamma ray or neutron detector, as determined from Monte Carlo modelling of the accelerator-based tool of FIG. 2.

The simplest use of the inverse normalized fluxes is to cross plot them. Such a cross plot is shown in FIG. 9, where the inverse fluxes have been obtained from Monte Carlo modelling of the accelerator-based tool depicted in FIG. 2. The cross plot of FIG. 9 is conceptually similar to the neutron-density cross plot that is conventionally used in wireline logging for lithology and porosity determination based on the responses of the standard bulk density and neutron porosity tools. See, for example, Ellis, Well Logging for Earth Scientists, Elsevier, 1987, pp. 420–421. The interpretation of the cross plot of FIG. 9 is likewise similar to that of the conventional neutron-density cross plot. Inverse count rates are plotted in FIG. 9 so that higher porosities will appear at the upper right of the plot and lower porosities at the lower left, as in the conventional neutron-density cross plot.

As shown in FIG. 9, there are curves 88, 90, 92 representing the porosity trends for the standard sandstone, limestone and dolomite lithologies. A measured point 94 (Flgm, Alm) can be plotted on this cross plot and its porosity and lithology can be interpolated as in the neutron-density cross plot, as represented by the dashed line 96. Shaly lithologies and gas bearing formations appear in the same relative positions on the cross plot of FIG. 9 as they do in the neutron-density cross plot, although their exact positions may differ systematically from those in the neutron-density cross plot.

One embodiment of the invention is a solution where the normalized inverse fluxes for the array and far detectors are used to derive the hydrogen index HI and the eV slowing down length $L_{epi}$ or the MeV slowing down length $L_h$. Specifically, this technique is based on the output of an array epithermal neutron detector 66a, 66b, which is mostly sensitive to hydrogen index but has a residual lithology effect, and the output of the far-spaced MeV detector 84 (either gamma ray or neutron), which is sensitive to hydrogen index as well as the MeV or eV slowing down lengths. The count rate signals from both detectors are normalized by the output of the near-spaced detector 62. For purposes of this technique, the far-spaced detector 84 could be selected to be sensitive to eV range neutrons, but fluxes in the MeV range are preferred because they are less sensitive to hydrogen index. Hence, the precision of the hydrogen index measurements is less important with MeV fluxes than it is with eV fluxes.

Figure 10:
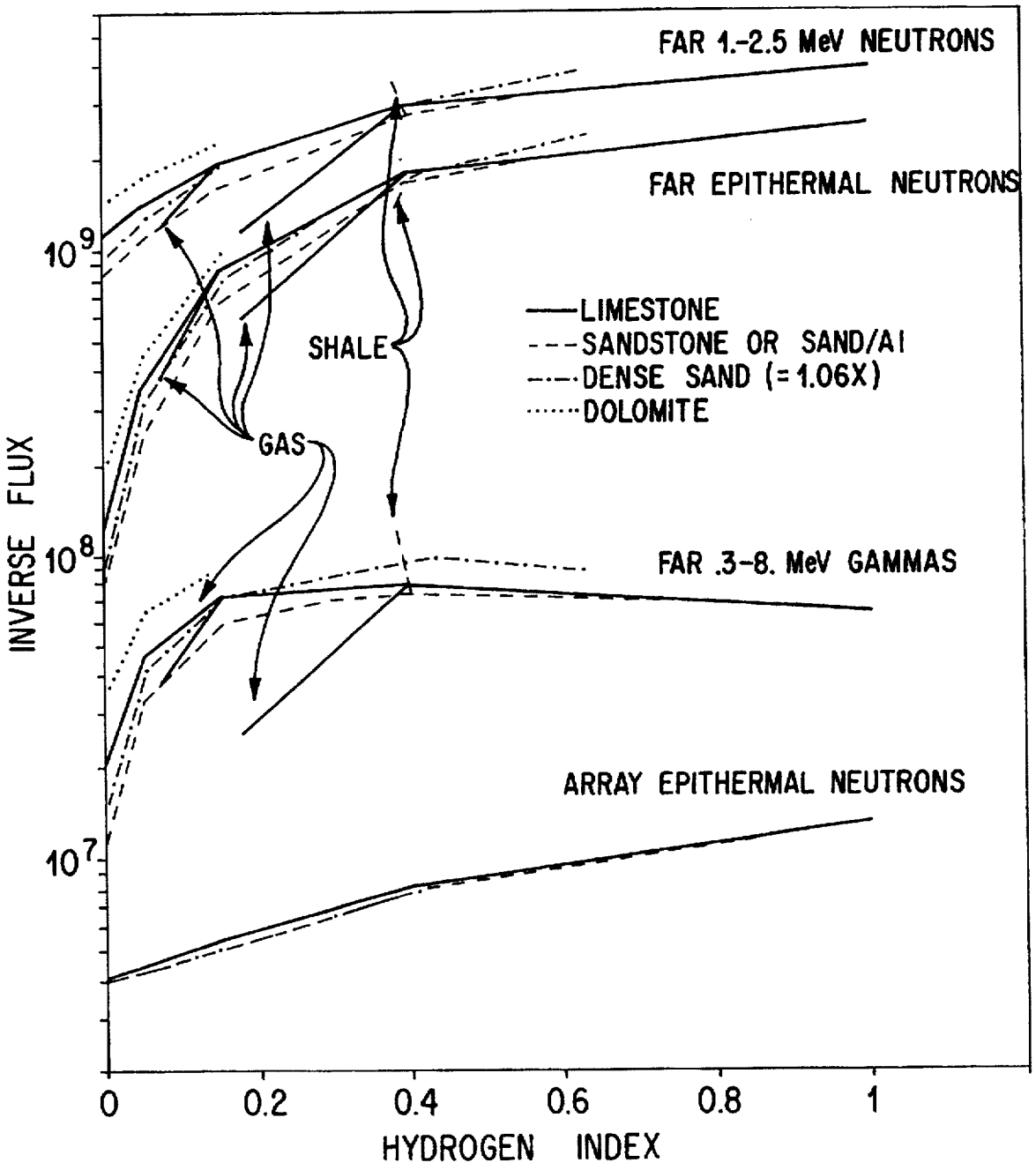
FIG. 10 is a cross plot of hydrogen index vs. inverse flux at different neutron and gamma ray energies and source/detector spacings in several standard lithologies, as determined from Monte Carlo modelling of the accelerator-based tool of FIG. 2.
Figure 11:
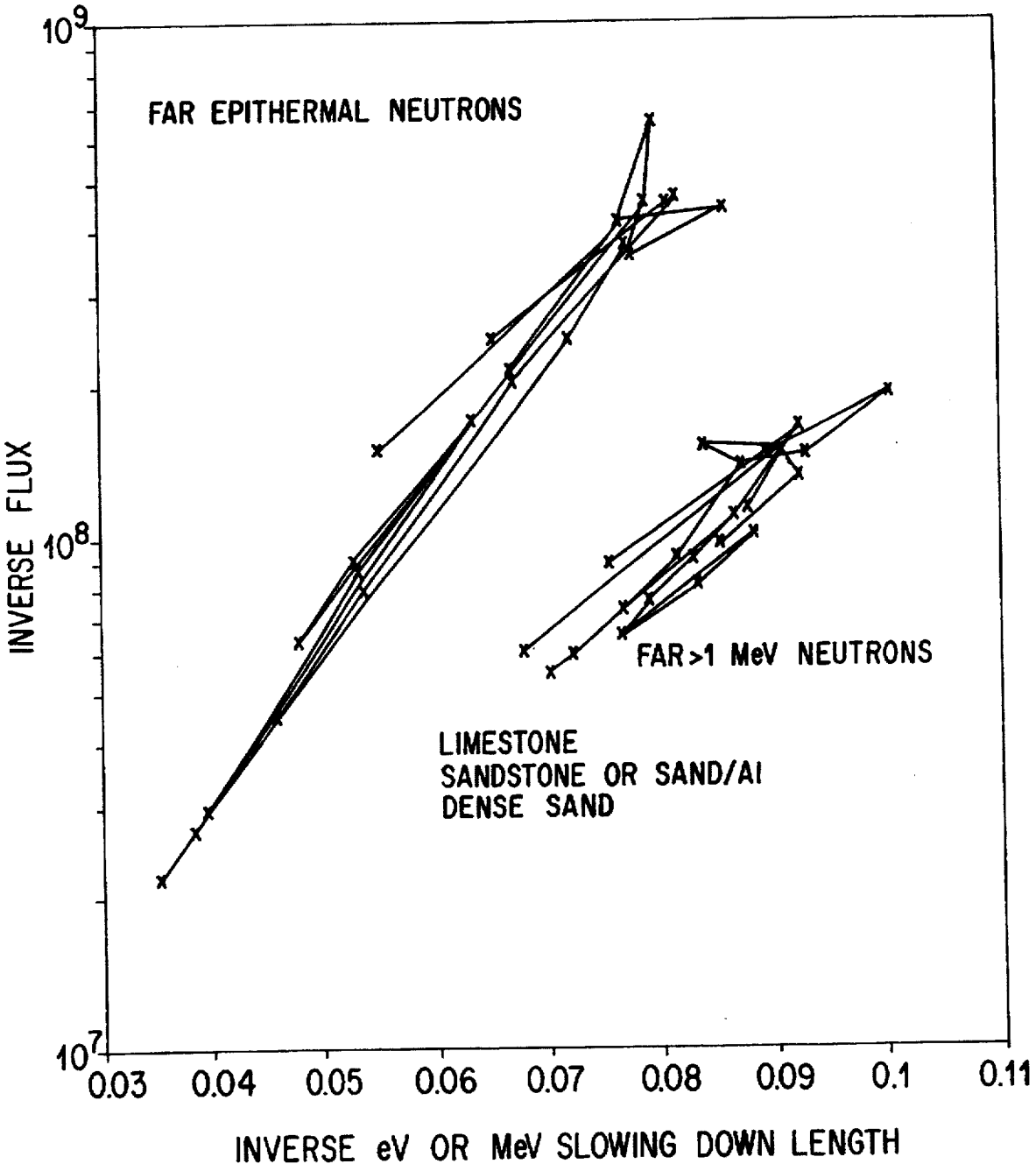
FIG. 11 is a cross plot of inverse eV or MeV slowing down length vs. inverse eV and MeV neutron flux for a far-spaced detector in several standard lithologies.

FIGS. 10 and 11 illustrate the responses of an array epithermal neutron detector, far-spaced eV and MeV neutron detectors and an MeV far-spaced gamma ray detector for a Monte Carlo modeled mock-up of the accelerator-based tool depicted in FIG. 2. The Monte Carlo simulation gives the flux of inelastic gamma rays in the far gamma ray detector. In what follows, reference to gamma ray fluxes means inelastic gamma rays. These may be separated from capture gamma rays by well known neutron accelerator pulsing techniques.

FIG. 10 shows the detector responses in a number of different formations versus hydrogen index. As may be seen, the array epithermal neutron detector responds mainly to hydrogen index, as all of the data fall nearly on a single curve with little lithology variation. The far-spaced gamma ray detector and eV and MeV neutron detectors show considerable lithology and density dependence as well as dependence on hydrogen index.

FIG. 11 plots the calculated inverse flux of eV and MeV neutrons at the far-spaced detector versus the respective slowing down lengths. These data show that formation slowing down length is the most important variable affecting the far neutron flux. Similarly, inspection of Monte Carlo data shows that eV slowing down length is the most important variable affecting the far inelastic gamma ray count.

It may be shown that the respective fluxes plotted in FIGS. 10 and 11 may be well fit by a combination of slowing down length ($L_{epi}$ for the eV slowing down length and $L_h$ for the MeV slowing down length) and hydrogen index (HI). The following illustrative models have been constructed for the array epithermal neutron detector and the preferred far-spaced MeV detector based on results from simulation programs, but could be constructed from experimental results if desired.

Array epi thermal detector model:

$$\text{Log (Inverse array flux)} = -0.8447\,(HI^2) + 2.0598\,(HI) - 12.8878 \quad (1)$$

Far-spaced MeV detector model:

$$\text{Log (Inverse Far MeV flux)}=35.74 * (1/L_h) + 1.159 * (\text{HI})-16.93 \quad (2)$$

It will be understood that other models may be employed, with the object of providing the best match to the data.

Given a set of array detector and far-spaced detector flux measurements, it is straightforward to solve the model equations (4) and (5) and obtain derived values of the hydrogen index and the inverse slowing down length.

Further techniques for cross plotting to derive hydrogen index (or porosity) and slowing down length are described below.

One such technique is based on the substantial difference in the n,p scattering cross section of formation constituents for neutrons below approximately 1 MeV as compared to that for neutrons above 1 MeV. For neutrons below approximately 1 MeV, the n,p scattering cross section is large and is due principally to elastic scattering with hydrogen nuclei. Consequently, the neutron slowing down length is strongly dependent on hydrogen concentration for neutrons with an initial energy of 1 MeV or lower. For neutrons above 1 MeV, on the other hand, the n,p scattering cross section decreases rapidly and becomes comparable with elastic scattering from heavier matrix elements, such as oxygen, silicon, calcium, etc. Elastic scattering from the heavier matrix elements, however, is relatively ineffective in slowing neutrons to low energies. Non-elastic reactions with matrix elements (mostly inelastic scattering (n,p) and (n,α) reactions) are much more effective at removing neutrons from the high energy region. Thus the neutron slowing down length for high energy neutrons (14 Mev—>1 MeV) exhibits increased sensitivity to matrix density and chemical composition and is only weakly dependent on hydrogen index (porosity). On the other hand, the low energy (<1 MeV—epithermal) slowing down length is primarily sensitive to hydrogen concentration.

Simple diffusion theory predicts a radial fall-off of high-energy neutron flux $\phi_h$ with distance r from the neutron source according to:

$$\phi_h = \frac{S}{4\pi \sum_{rh} L_h^2} \frac{e^{-\left(\frac{r}{L_h}\right)}}{r} \quad (3)$$

where S is the source strength, $\Sigma_{rh}$ is the macroscopic cross section for the removal of neutrons from the 1–14 MeV energy range, and $L_h$ is the high energy slowing down length.

Given two measurements of the >1 MeV neutron flux at different source/detector spacings $r_1$ and $r_2$, a direct measurement of $L_h$ can be made:

$$L_h = \frac{(r_1 - r_2)}{\ln\left(\frac{r_2\phi_h(r_2)}{r_1\phi_h(r_1)}\right)} \quad (4)$$

where $\phi_h(r_1)$ and $\phi_h(r_1)$ are the >1 MeV neutron flux measurements at distances $r_1$ and $r_2$, respectively.

The epithermal neutron flux $\phi_{epi}$ follows a similar law in one group diffusion theory:

$$\phi_{epi} = \frac{S}{4\pi \sum_{rh} L_{epi}^2} \frac{e^{-\left(\frac{r}{L_{epi}}\right)}}{r} \quad (5)$$

where $\Sigma_{rs}$ is the macroscopic cross section for the removal of neutrons from the 14 MeV—>epithermal range and $L_{epi}$ is the length for neutron slowing from 14 MeV to 0.5 eV (the cadmium cutoff).

Figure 12:
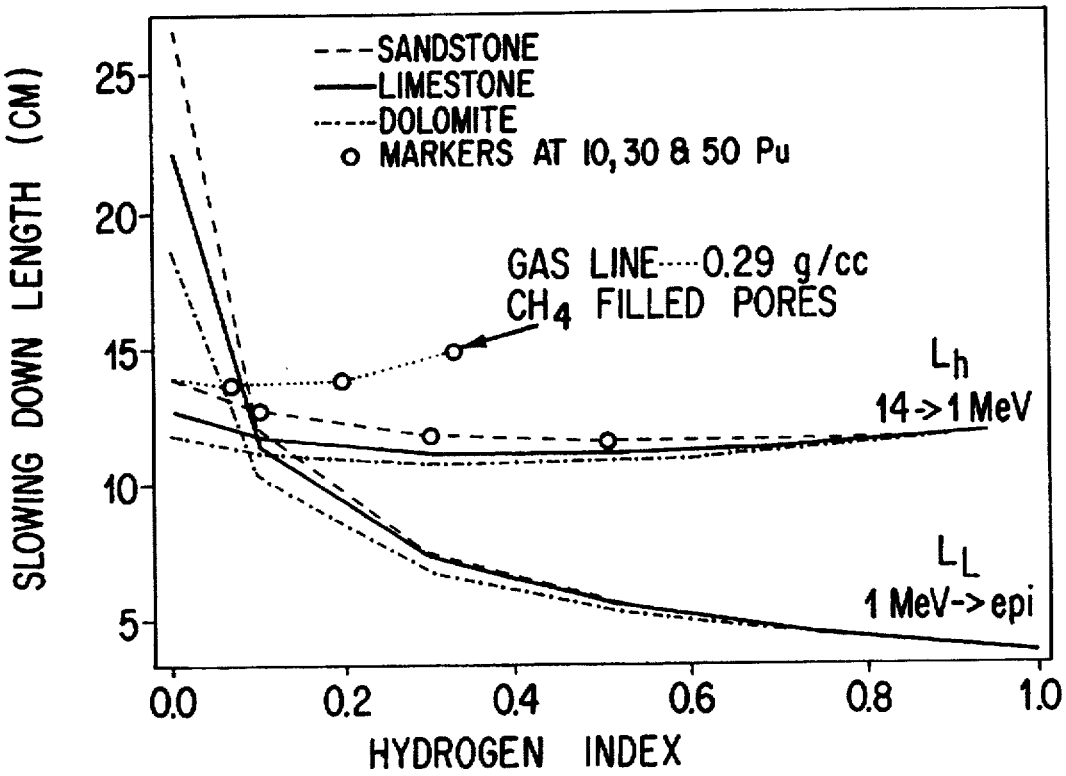
FIG. 12 is a cross plot of hydrogen index vs. neutron slowing down length at both eV and MeV neutron energy ranges in three standard lithologies.

Although $L_{epi}$ has some dependence on the matrix, the flux dependence of these variations vanishes at a source/detector spacing of 2 $L_{epi}$. Also, the source factor S can be eliminated by normalizing the 1 MeV flux measurement with a like measurement at a short source/detector spacing. Thus, with an epithermal neutron detector, e.g. detector 66a in FIG. 2, and two spaced 1 MeV detectors, e.g. detectors 62 and 84 in FIG. 2, measurements can be made of both porosity (hydrogen index) and $L_{epi}$ and/or $L_h$. A cross plot of these measurements can then determine porosity and matrix type and identify gas, as illustrated in FIG. 12.

Figure 13:
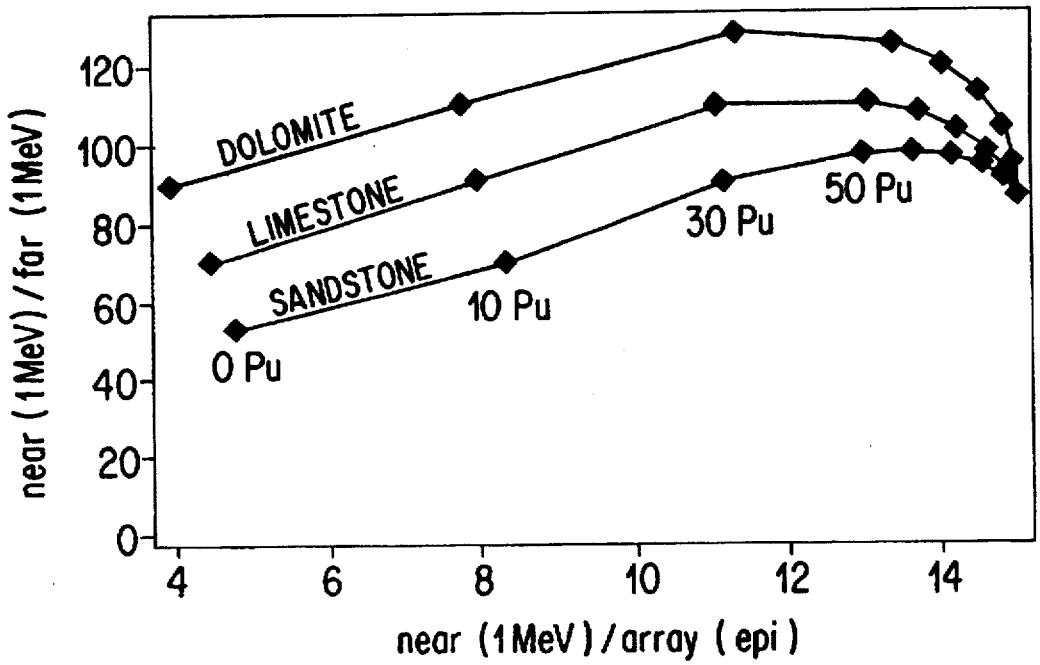
FIG. 13 is a cross plot of the normalized inverse epithermal neutron flux at an array detector vs. the normalized inverse MeV flux at a far-spaced detector in three standard lithologies.

In an alternative presentation similar to that of FIG. 9, the inverse neutron count rate from the far-spaced MeV detector (detector 84 in FIG. 2), normalized by the count rate of a near-spaced MeV detector (detector 62 in FIG. 2), is cross-plotted against the inverse neutron count rate from an epithermal neutron detector at a 2 Ls spacing (array detector 66a in FIG. 2), normalized by the count rate from the near-spaced MeV detector. Such a cross plot is shown in FIG. 13 for a near MeV detector spacing of 20 cm, an epithermal neutron detector spacing of 30 cm and a far MeV detector spacing of 60 cm. As there indicated, the three curves correspond to the three major rock matrices, dolomite (2.87 g/cc), limestone (2.71 g/cc) and sandstone (2.64 g/cc). As expected, the near/far ratio and the near/array ratio provide almost independent measures of matrix type and porosity, respectively. The interpretation of this cross plot to obtain porosity and lithology and to detect gas is as described above in connection with FIG. 9.

The measured slowing down length $L_{epi}$ or $L_h$ and the measured hydrogen index HI may be used to derive the bulk density of a formation. One technique for this purpose is described below. An alternative technique is described in the commonly-owned, copending U.S. patent application Ser. No. 08/006,903, which will issue as U.S. Pat. No. 5,349,184 on Sep. 20, 1994, which is hereby incorporated by reference.

In the following discussion, the term slowing down length may refer to either $L_{epi}$ or $L_h$; for the actual examples $L_{epi}$ is used. Starting from a standard formation such as porous limestone or sandstone for which the slowing down length, the hydrogen index (the same as the porosity) and the bulk density are all known, the ratio between small changes in the bulk density of the standard formation and the resultant small changes in its slowing down length is calculated. This ratio is referred to as the density-slowing down length sensitivity ratio. The ratio can be used, under assumptions to be described, so that a small change in slowing down length will allow calculation of a small change in bulk density which can be added to the bulk density of the standard formation to determine the bulk density of the measured formation. Since the invention measures slowing down lengths and hydrogen index, the slowing down length difference can be calculated from the measured slowing down length of an unknown formation and that of the standard porous formation having the same hydrogen index as the measured hydrogen index for the unknown formation.

The calculation of the slowing down length of a formation of known elemental composition may be done by analytic or Monte Carlo methods. A suitable analytic method is described by A. Kreft, "Calculation of the Neutron Slowing Down Length in Rocks and Soils", Nukleonika, Vol. 19, 145–156, 1974; "A Generalization of the Multigroup Approach for Calculating the Neutron Slowing Down Length", Inst. of Nuclear Physics and Techniques (Cracow) Report 32/I, 1972, which are hereby incorporated by reference.

Figure 14A:
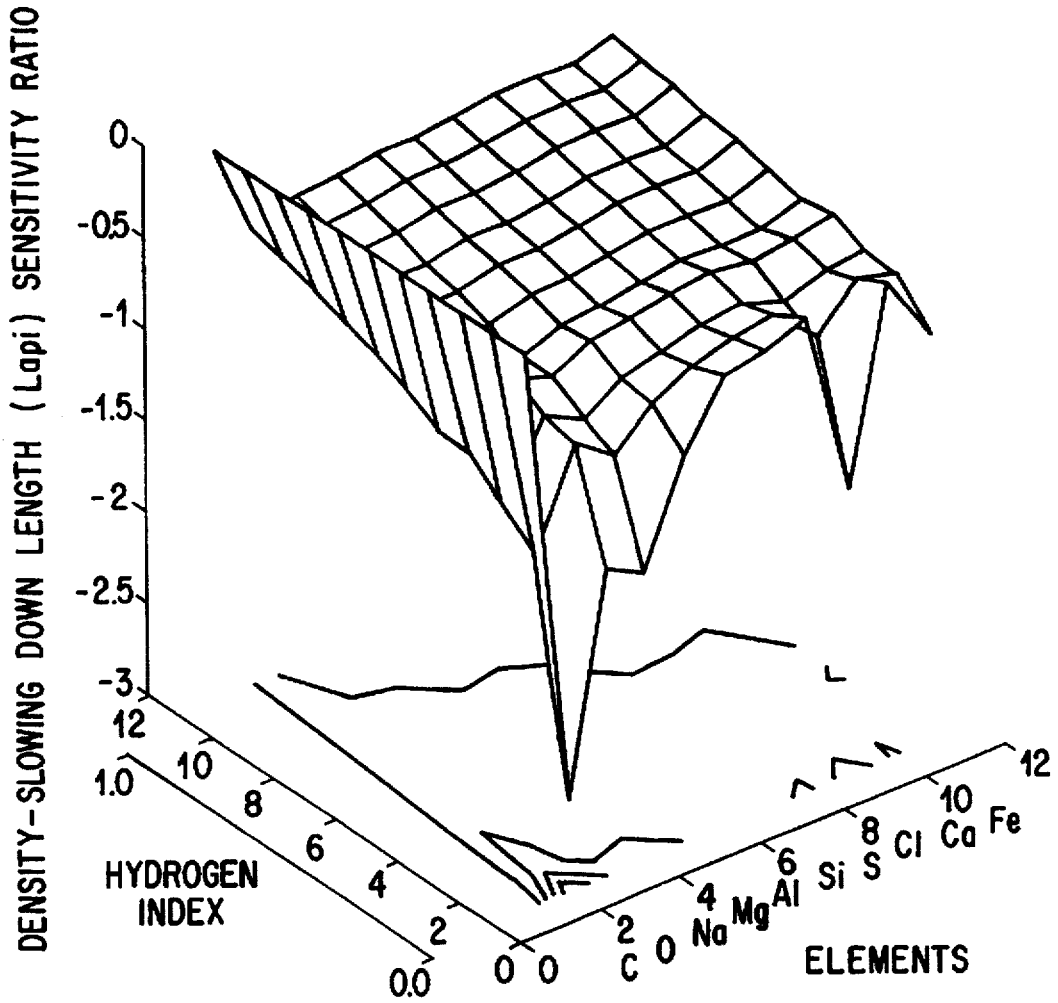
FIG. 14A is a surface representation of the epithermal neutron density-slowing down length sensitivity ratio as a function of chemical element and hydrogen index of porous sandstone.
Figure 14B:
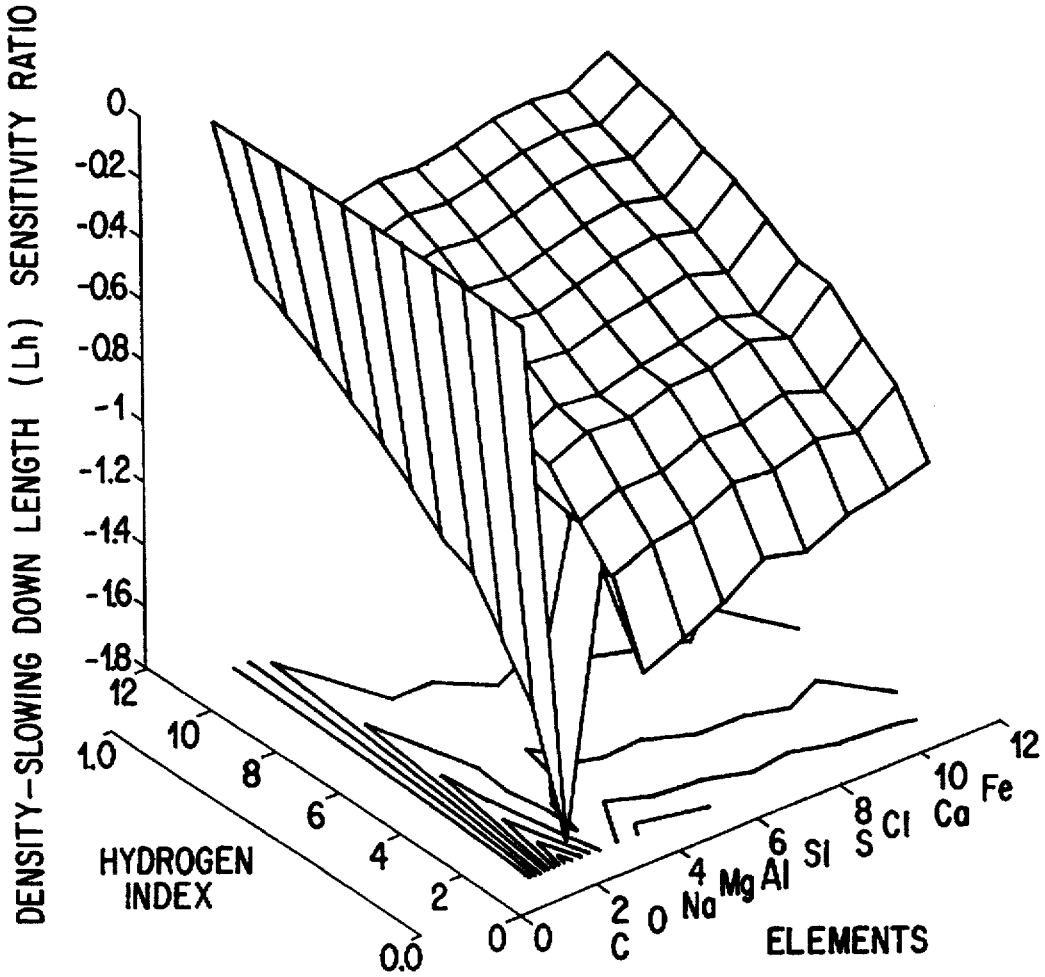
FIG. 14B is a surface representation of the MeV neutron density-slowing down length sensitivity ratio as a function of chemical element and hydrogen index of porous sandstone.
Figure 15B:
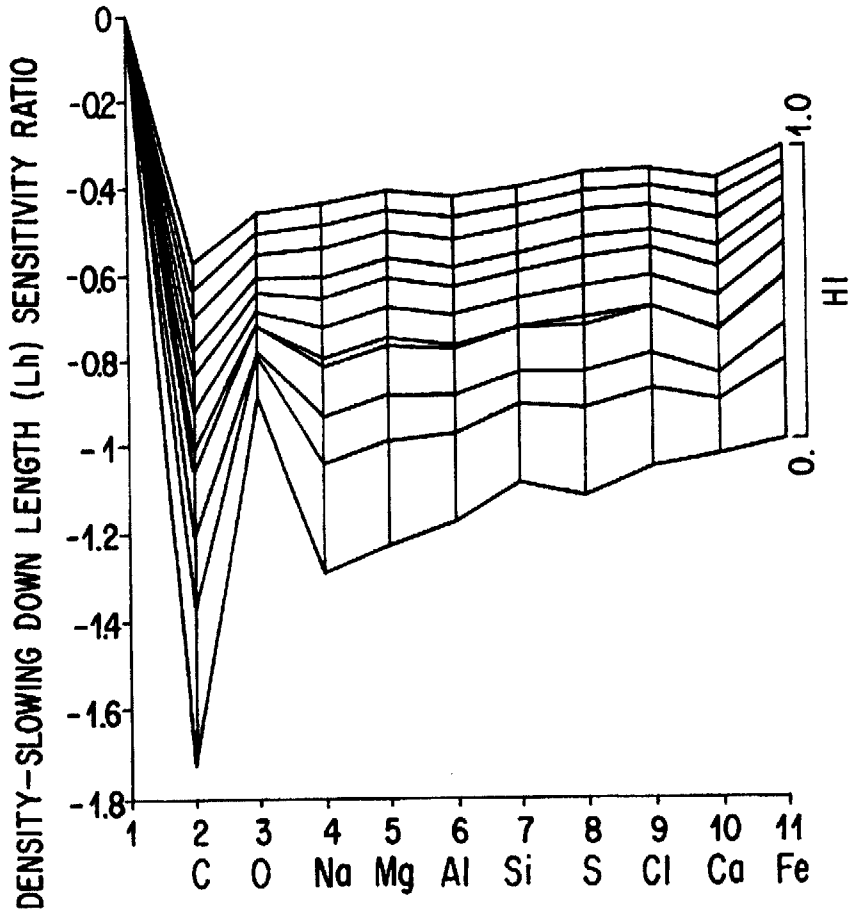
FIG. 15B is a projection of the surface representation of FIG. 14B.
Figure 15A:
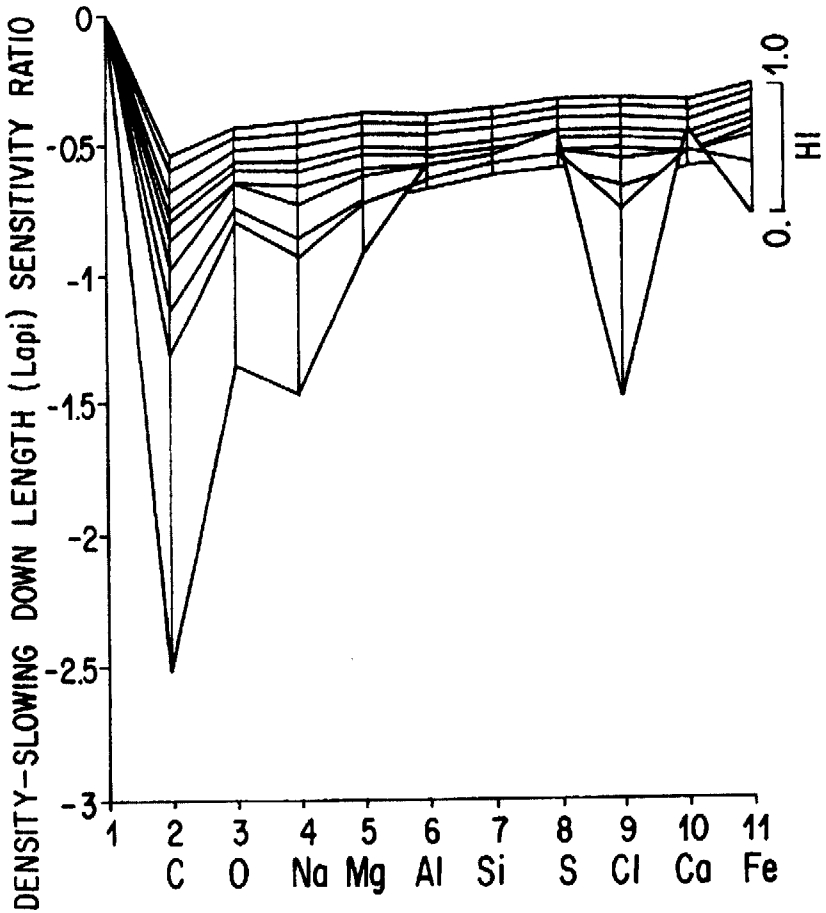
FIG. 15A is a projection of the surface representation of FIG. 14A.

The following is an example of the calculation of the density-slowing down length sensitivity ratio. Using a computer code implementation of Kreft's method, the epithermal neutron slowing down length of a standard formation, say 30 pu limestone (hydrogen index, HI=0.3; bulk density, 2.197 g/cc; 0.033 g/cc hydrogen, 0.228 g/cc carbon, 1.176 g/cc oxygen, 0.760 g/cc calcium) is calculated to be 13.27 cm. The epithermal slowing down length of a similar formation like the first but with the addition of 0.05 g/cc of a common formation element such as aluminum (hydrogen index, HI=0.3, bulk density=2.247 g/cc) is calculated to be 13.08 cm. The difference between the resulting slowing down lengths is $dL_{epi}$=−0.19 cm. This difference results from the difference in the input aluminum densities of 0.05 g/cc. The density-slowing down length sensitivity ratio is the percentage change in slowing down length: −0.19/13.27=−1.43% divided by the percentage change in density, 2.27%, the ratio being −0.63. FIGS. 14A and 14B show these ratios for epithermal and MeV slowing down lengths, respectively, as surface functions of the hydrogen index of porous sandstone and of the element whose density changes relative to the porous sandstone elemental composition. Projections of these surfaces are shown in FIGS. 15A and 15B. The density-slowing down sensitivity ratios calculated for porous limestone are very similar to those for sandstone.

Figure 16:
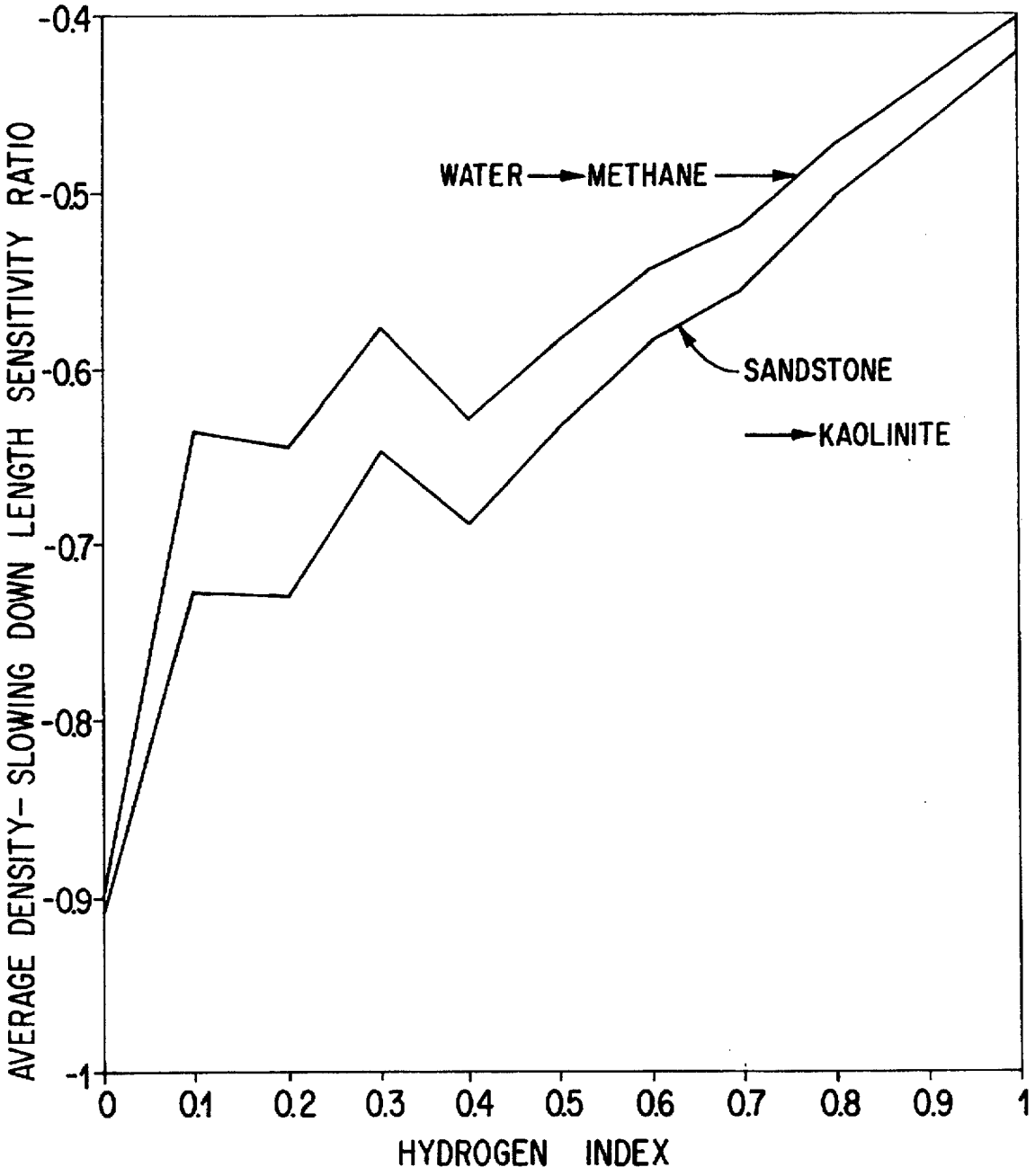
FIG. 16 is a cross plot of hydrogen index vs. the average density-slowing down length sensitivity ratio for a partially gas-saturated formation and a partially kaolinite clay-bearing formation.

An average density-slowing down length sensitivity ratio may be calculated for any formation having the same hydrogen index as a standard porous formation. This ratio is a weighted average over the sensitivity ratios for each element whose density differs. The weighting is proportional to the density difference for each element. FIG. 16 shows the epithermal ratio for two typical formations as a function of hydrogen index. The formations are partially gas saturated formations (0.2 g/cc methane replaces water) or formations in which kaolinite clay (formula A14Si4018H8, density 2.54 g/cc) partially replaces the standard formation and are calculated relative to porous sandstone. The average ratio is highly insensitive to whether gas or clay is involved. Thus for a given measured hydrogen index of say 0.30 (30 pu porosity), the density-slowing down length sensitivity ratio is −0.63 to an accuracy of 10%.

The key feature of the density-slowing down length sensitivity ratio is that it is insensitive to the element causing the change in density, unless that element is carbon, or in the case of the epithermal slowing down length $L_{epi}$ only, sodium and chlorine. Thus for many formations common to well logging, such as those above, the density-slowing down length sensitivity ratio is accurately known. This ratio may be applied to the percentage difference in slowing down length of a measured formation relative to a standard formation (such as porous sandstone of the same hydrogen index), to calculate the percentage difference of the density of the measured formation relative to the standard formation. The percentage difference leads in turn to the density of the measured formation. Provided that the measured formation is not too different from the standard formation in terms of the amount of carbon (or chlorine and sodium for epithermal slowing down length), the calculated bulk density of the measured formation will be accurate.

As a further refinement of the invention, knowledge of the elemental composition of the formation gained from gamma spectroscopy can be used to refine the calculation of the appropriate density sensitivity ratio.

Because the measurement subassembly rotates along with the drill string 14, provision is made for making the aforementioned measurements as a function of the angular or azimuthal orientation of the tool as the tool turns during drilling. Various methods and apparatus are known in the art for that purpose. For example, U.S. Pat. No. 5,091,644, hereby incorporated by reference, discloses an azimuthal measuring system in which the borehole cross section is divided into two or more segments, e.g., quadrants. As the tool rotates, it passes through the borehole segments.

Each time it passes a segment boundary, a counter is incremented, pointing to the next segment. This allows the data, e.g. gamma ray or neutron count rates, to be segregated according to the respective segments which each detector was traversing when the measurements were made. In this way, plural angular or azimuthal measurements can be made at each depth level. The separate segmental measurements may be combined, to provide an average measurement for the depth level, or they may be processed separately, as, for example, where borehole conditions, such as a washout, indicate that one or more of the segmental measurements is unreliable.

In the commonly-owned, copending U.S. patent application Ser. No. 08/183,089 for "Logging While Drilling Method and Apparatus for Measuring Formation Characteristics as a Function of Angular Position Within a Borehole", filed Jan. 14, 1994, by J. M. Holenka et al., improved methods and apparatus are disclosed for making neutron porosity, bulk density and other measurements as the tool rotates in the borehole and relating them to the azimuthal position of the tool. The measurements are made in angular distance segments which preferably are quadrants, but which may be greater or less than four in number and need not be of equal angular distance. The angular segments are measured from the down vector of the measurement-while-drilling tool. The down vector is preferably derived by first determining an angle $\phi$ between a vector to earth's north magnetic pole, as referenced to the cross sectional plane of the measuring-while-drilling tool and a gravity down vector as referenced in such plane. To that end, orthogonally arranged magnetometers may be provided to continuously determine the angle $\phi$. Alternatively, surveys may be performed periodically by the measuring-while-drilling tool when drilling is halted to add drill pipe to the drill string. The Holenka et al. disclosure is applicable both to tools with and without stabilizer collars. The disclosure of the Holenka et al. application is likewise incorporated herein by reference.

Although the invention has been described and illustrated herein by reference to exemplary embodiments thereof, it will be understood by those skilled in the art that such embodiments are susceptible of variation and modification without departing from the inventive concepts disclosed. All such variations and modifications, therefore, are intended to be included within the spirit and scope of the appended claims.

We claim:

1. Measurement-while-drilling apparatus for measuring properties of earth formations surrounding a borehole being drilled by a drill bit at the end of a drill string, comprising:

an elongated tubular drill collar in said drill string;

a high energy neutron accelerator in said drill collar;

a first neutron detector in said drill collar at a first spacing from the accelerator in the lengthwise direction of the drill collar, said first neutron detector having an output that is primarily proportional to the accelerator neutron flux;

a second neutron detector in said drill collar at a second, farther spacing from the accelerator in the lengthwise direction of the drill collar, said second neutron detector being sensitive to epithermal neutrons and having an output that is primarily responsive to the hydrogen concentration of the surrounding earth formation and only secondarily responsive to the density of the surrounding earth formation;

a third radiation detector in said drill collar at a third, still farther spacing from the accelerator in the lengthwise direction of the drill collar, said third detector having an output that is more responsive to the density of the surrounding earth formation and less responsive to the hydrogen concentration of the surrounding earth formation than is the second detector;

means for recording the respective outputs of said first, second and third detectors as a function of borehole depth and means for determining a parameter related to the formation density from the respective outputs.

2. The apparatus of claim 1, wherein:

said second neutron detector is located closely adjacent the interior wall of the drill collar; and said second neutron detector is back-shielded against neutrons incident thereon from the borehole.

3. The apparatus of claim 2, further comprising means defining a neutron window in the drill collar immediately adjacent to said second neutron detector.

4. The apparatus of claim 3, wherein the neutron-window defining means comprises a body of relatively low-scattering cross section material in the drill collar.

5. The apparatus of claim 4, wherein said body of relatively low-scattering cross section material is composed of titanium.

6. The apparatus of claim 5, wherein said titanium body is sheathed in boron.

7. The apparatus of claim 4, wherein:

the exterior surface of the drill collar is surrounded by a layer of neutron absorbing material in the region of the second detector; and said layer of neutron-absorbing material has an opening formed therein at the location of said body of relatively low-scattering cross section material.

8. The apparatus of claim 7, wherein said neutron-window defining means comprises a plurality of spaced-apart transverse layers of neutron-absorbing material in the drill collar in the region of the second detector.

9. The apparatus of claim 4, wherein said neutron-window defining means further comprises a plurality of spaced-apart lengthwise-extending layers of neutron absorbing material in the drill collar in the region of the second detector.

10. The apparatus of claim 2, further comprising means for processing the output of said second neutron detector to derive a measurement of the epithermal neutron slowing down time of the surrounding earth formation.

11. The apparatus of claim 10, wherein said processing means further derives a standoff-corrected measurement of the porosity of the surrounding earth formation.

12. The apparatus of claim 11, wherein said processing means further derives a measurement of standoff.

13. The apparatus of claim 1, wherein said first neutron detector comprises an epithermal neutron detector shielded on all sides thereof except the side facing the neutron accelerator with neutron moderating-absorbing material.

14. The apparatus of claim 1, wherein said first neutron detector comprises an MeV range neutron detector shielded on all sides thereof except the side facing the neutron acceleration with a high-Z material.

15. The apparatus of claim 14, wherein said first neutron detector is a $^4$He detector.

16. The apparatus of claim 1, wherein said third detector comprises a gamma ray detector.

17. The apparatus of claim 1, wherein said third detector is an MeV range neutron detector.

18. The apparatus of claim 17, wherein said third detector is a $^4$He detector.

19. The apparatus of claim 16 or 17, further comprising an intervening neutron shield located between said neutron detector and said third radiation detector.

20. The apparatus of claim 1, further comprising a gamma ray detector located at an intermediate spacing in the lengthwise direction of the drill collar between said first and third detectors.

21. The apparatus of claim 20, wherein said gamma ray detector is located at substantially the same distance from the accelerator in the lengthwise direction of the drill collar as in said second detector.

22. The apparatus of claim 16 or 20, further comprising means for spectrally analyzing the output of said gamma ray detector to obtain information concerning the lithology of the surrounding earth formation.

23. The apparatus of claim 1 wherein:

a drilling fluid channel is located within said drill collar to one side of the longitudinal axis thereof; and the accelerator and the first neutron detector are eccentered to the other side of the drill collar longitudinal axis and are substantially coaxially aligned with one another.

24. The apparatus of claim 23, wherein:

the second neutron detector is located closely adjacent the inner wall of the drill collar; and the third radiation detector is substantially coaxially aligned with the accelerator and the first neutron detector.

25. The apparatus of claim 1, wherein the lengthwise spacing between the second neutron detector and the accelerator is substantially twice the low-energy epithermal neutron slowing down length ($L_{epi}$).

26. The apparatus of claim 1, further comprising at least one thermal neutron detector located at an intermediate spacing in the lengthwise direction of the drill collar between the first and third detectors.

27. The apparatus of claim 26, further comprising means for processing the output of said thermal neutron detector to derive a measurement of at least one of standoff and the formation macroscopic cross section for capture of thermal neutrons.

28. The apparatus of claim 1, further comprising a plurality of said second epithermal neutron detectors located at substantially the same lengthwise position in the drill collar and spaced apart circumferentially of the drill collar to provide enhanced angular or azimuthal resolution.

29. The apparatus of claim 1, wherein said second detector is located within a recess formed in the wall of the drill collar and is back-shielded against borehole neutrons by a neutron moderating-absorbing material.

30. The apparatus of claim 1, further comprising means for recording said detector outputs as a function of the angular orientation of the drill collar within the borehole.

31. The apparatus of claim 1, further comprising means for recording said detector outputs as a function of the azimuthal orientation of the drill collar within the borehole.

32. The apparatus of claim 1, wherein:

said first neutron detector is shielded against formation-origin neutrons by a high-Z material; and said second and third detectors are shielded against source neutrons transported along the drill collar by a neutron moderating-absorbing material.

33. The apparatus of claim 1, further comprising means for combining the outputs of said first, second and third detectors to derive an indication of at least one of the porosity, density and lithology of or the presence of gas in the surrounding earth formation.

34. The apparatus of claim 33, wherein:

said third detector comprises a neutron detector;

said first and third detector outputs are combined to derive a measurement of at least one of the high energy neutron slowing down length ($L_h$) and the low-energy neutron slowing down length ($L_{epi}$);

the lengthwise spacing between the second detector and the accelerator is substantially twice the low-energy neutron slowing down length ($L_{epi}$);

said first and second detector outputs are combined to derive a measurement of hydrogen index; and said at least one $L_h$ measurement or $L_{epi}$ measurement and said hydrogen index measurement are cross plotted to obtain information of at least one of the porosity and lithology of the surrounding earth formation.

35. The apparatus of claim 33, wherein:

said third detector comprises a neutron detector;

the lengthwise spacing between said second detector and the accelerator is substantially twice the low-energy neutron slowing down length ($L_{epi}$);

the outputs of the second and third detectors normalized by the output of the first detector; and the normalized outputs of the second and third detectors are cross plotted by said combining means to provide information of at least one of porosity, lithology and the presence of gas in the surrounding earth formation.

36. The apparatus of claim 33, wherein the output combining means combines said first detector output with the outputs of said second detector and said third detector by normalizing the outputs of said second and third detectors with said first detector output.

37. The apparatus of claim 36, wherein the combining means combines the normalized outputs of said second and third detectors by cross plotting said normalized outputs.

38. The apparatus of claim 36, wherein said combining means, in accordance with a first predetermined empirical relationship, derives a value of the hydrogen index from the normalized second detector output and, in accordance with a second predetermined empirical relationship, derives a value of the neutron slowing down length from the normalized third detector output and said value of the hydrogen index.

39. A method for measuring properties of earth formations surrounding a borehole being drilled by a drill bit at the end of a drill string, comprising:

providing a high energy neutron accelerator in said drill string;

providing a first neutron detector in said drill string at a first spacing from the accelerator in the lengthwise direction of the drill string, said first neutron detector having an output that is primarily proportional to the accelerator neutron flux;

providing a second neutron detector in said drill string at a second, farther spacing from the accelerator in the lengthwise direction of the drill string, said second neutron detector being sensitive to epithermal neutrons and having an output that is primarily responsive to the hydrogen concentration of the surrounding earth formation and only secondarily responsive to the density of the surrounding earth formation;

providing a third radiation detector in said drill string at a third, still farther spacing from the accelerator in the lengthwise direction of the drill string, said third detector having an output that is more responsive to the density of the surrounding earth formation and less responsive to the hydrogen concentration of the surrounding earth formation than is said second detector; and combining the outputs of said first, second and third detectors to derive an indication of at least density of the surrounding earth formation.

40. The method of claim 39, wherein said combining step comprising combining said first detector output with the outputs of said second detector and said third detector by normalizing the outputs of said second and third detectors with said first detector output.

41. The method of claim 40, wherein said combining step further comprises cross plotting the normalized outputs of said second and third detectors.

42. The method of claim 41, wherein the normalized outputs cross plotted are inverse normalized outputs.

43. The method of claim 40, wherein said combining step, in accordance with a first predetermined empirical relationship, derives a value of the hydrogen index from the normalized second detector output and, in accordance with a second predetermined empirical relationship, derives a value of the neutron slowing down length from the normalized third detector output and said value of the hydrogen index.

44. The method of claim 43, wherein said combining step further comprises combining said hydrogen index value and said slowing down length value to obtain information of at least one of porosity, lithology, and the presence of gas in the surrounding earth formation.

45. The method of claim 39, wherein:

said third detector comprises a neutron detector;

said first and third detector outputs are combined to derive a measurement of at least one of the high energy neutron slowing down length ($L_h$) and the low-energy slowing down length ($L_{epi}$);

the lengthwise spacing between the second detector and the accelerator is substantially twice the low-energy neutron slowing down length ($L_{epi}$);

the first and second detector outputs are combined to derive a measurement of hydrogen index; and said at least one $L_h$ measurement or $L_{epi}$ measurement and said hydrogen index measurement are cross plotted to obtain information of at least one of the porosity and lithology of the surrounding earth formation.

46. The method of claim 39, wherein:

said third detector comprises a neutron detector;

the lengthwise spacing between said second detector and the accelerator is substantially twice the low-energy neutron slowing down length ($L_{epi}$);

the outputs of the second and third detectors are normalized by the output of the first detector; and the normalized outputs of the second and third detectors are cross plotted to provide information of at least one of porosity, lithology and the presence of gas in the surrounding earth formation.

47. The method of claim 39, wherein the combining step comprises:

combining the normalized outputs of said second and third detectors to derive values of the hydrogen index and the high-energy neutron slowing down length ($L_h$) or the low-energy neutron slowing down length ($L_{epi}$) for the surrounding earth formation;

combining said values of the hydrogen index and $L_h$ or $L_{epi}$, in accordance with a predetermined relationship relating changes in the measured values of $L_h$ or $L_{epi}$ to changes in bulk density for a calibration formation of known bulk density, hydrogen index and elemental composition, to obtain information of the bulk density of the surrounding earth formation.

48. The method of claim 39, wherein the combining step comprises:

determining the hydrogen index and the neutron slowing down length of the surrounding earth formation;

determining the difference between said slowing down length and the neutron slowing down length of a calibration formation of substantially the same hydrogen index and known bulk density; and combining said neutron slowing down time difference with the density-slowing down length sensitivity ratio for the calibration formation to obtain a measurement of the bulk density of the surrounding earth formation.

49. Measurement-while-drilling apparatus for measuring properties of earth formations surrounding a borehole being drilled by a drill bit at the end of a drill string, comprising:

an elongated tubular drill collar in said drill string;

a neutron accelerator in said drill collar for irradiating the surrounding earth formations with high energy neutrons;

at least one radiation detector in said drill collar spaced from the accelerator in the lengthwise direction of the drill collar for detecting radiation resulting from said neutron irradiation and generating an output in response to said detected radiation, the spacing being such that the radiation resulting from said neutron irradiation is influenced by the density of the formations; and means for recording the output of said at least one detector as a function of at least one of borehole depth and azimuthal orientation within the borehole and means for determining a parameter related to the density of the earth formation.

50. A method for measuring the properties of earth formations surrounding a borehole being drilled by a drill bit at the end of a drill string, comprising:

providing a neutron accelerator in said drill string for irradiating the earth formations with high energy neutrons;

providing at least one radiation detector in said drill string spaced from the accelerator in the lengthwise direction of the drill string for detecting radiation resulting from said neutron irradiation of the earth formations and for generating an output in response to said detected radiation, the spacing being such that the radiation resulting from said neutron irradiation is influenced by the density of the formations; and recording the output of said at least one detector as a function of at least one of borehole depth and azimuthal orientation in the borehole and means for determining a parameter related to the density of the earth formation.

*51. An apparatus for measuring properties of earth formations surrounding a borehole, comprising:*

*a) a housing;*

*b) a high energy neutron accelerator in the housing for irradiating the formations from within the borehole;*

*c) a first neutron detector in said housing at a first spacing from the accelerator in the lengthwise direction of said housing, said first neutron detector having an output that is primarily proportional to the accelerator neutron flux;*

*d) a second neutron detector in said housing at a second, farther spacing from the accelerator in the lengthwise direction of said housing, said second neutron detector being sensitive to epithermal neutrons and having an output that is primarily responsive to the hydrogen concentration of the surrounding earth formation and only secondarily responsive to the density of the surrounding earth formation;*

*e) a third radiation detector in said housing at a third, still farther spacing from the accelerator in the lengthwise direction of said housing, said third detector having an output that is more responsive to the density of the surrounding earth formation and less responsive to the hydrogen concentration of the surrounding earth formation than is the second detector;*

*f) means for recording the respective outputs of said first, second and third detectors; and*

*g) means for determining a parameter related to the formation density from the respective outputs.*

*52. The apparatus of claim 51, wherein:*

*said neutron detector is located closely adjacent the interior wall of said housing; and*

*said second neutron detector is back-shielded against neutrons incident thereon from the borehole.*

*53. The apparatus of claim 52, further comprising means defining a neutron window in said housing immediately adjacent to said second neutron detector.*

*54. The apparatus of claim 53, wherein the neutron-window defining means comprises a body of relatively low-scattering cross section material in said housing.*

*55. The apparatus of claim 54, wherein said body of relatively low-scattering cross section material is composed of titanium.*

*56. The apparatus of claim 55, wherein said titanium body is sheathed in boron.*

*57. The apparatus of claim 54, wherein:*

*the exterior surface of said housing is surrounded by a layer of neutron absorbing material in the region of the second detector; and*

*said layer of neutron-absorbing material has an opening formed therein at the location of said body of relatively low-scattering cross section material.*

*58. The apparatus of claim 57, wherein said neutron-window defining means comprises a plurality of spaced-apart transverse layers of neutron-absorbing material in said housing in the region of the second detector.*

*59. The apparatus of claim 54, wherein said neutron-window defining means further comprises a plurality of spaced-apart lengthwise-extending layers of neutron absorbing material in said housing in the region of the second detector.*

*60. The apparatus of claim 52, further comprising means for processing the output of said second neutron detector to derive a measurement of the epithermal neutron slowing down time of the surrounding earth formation.*

61. The apparatus of claim 60, wherein said processing means further derives a standoff-corrected measurement of the porosity of the surrounding earth formation.

62. The apparatus of claim 61, wherein said processing means further derives a measurement of standoff.

63. The apparatus of claim 51, wherein said first neutron detector comprises an epithermal neutron detector shielded on all sides thereof except the side facing the neutron accelerator with neutron moderating-absorbing material.

64. The apparatus of claim 51, wherein said first neutron detector comprises an MeV range neuron detector shielded on all sides thereof except the side facing the neutron acceleration with a high-Z material.

65. The apparatus of claim 64, wherein said first neutron detector is a $^4He$ detector.

66. The apparatus of claim 51, wherein said third detector comprises a gamma ray detector.

67. The apparatus of claim 51, wherein said third detector is an MeV range neutron detector.

68. The apparatus of claim 67, wherein said third detector is a $^4He$ detector.

69. The apparatus of claim 66 or 67, further comprising an intervening neutron shield located between said neutron detector and said third radiation detector.

70. The apparatus of claim 51, further comprising a gamma ray detector located at an intermediate spacing in the lengthwise direction of the housing between said first and third detectors.

71. The apparatus of claim 70, wherein said gamma ray detector is located at substantially the same distance from the accelerator in the lengthwise direction of the housing as is said second detector.

72. The apparatus of claim 66 or 67, further comprising means for spectrally analyzing the output of said gamma ray detector to obtain information concerning the lithology of the surrounding earth formation.

73. The apparatus of claim 51, wherein the length wise spacing between the second neutron detector and the accelerator is substantially twice the low-energy epithermal neutron slowing down length ($L_{epi}$).

74. The apparatus of claim 51, further comprising at least one thermal neutron detector located at an intermediate spacing in the lengthwise direction of the housing between the first and third detectors.

75. The apparatus of claim 74, further comprising means for processing the output of said thermal neutron detector to derive a measurement of at least one of standoff and the formation macroscopic cross section for capture of thermal neutrons.

76. The apparatus of claim 51, further comprising means for recording said detector outputs as a function of the angular orientation of the housing within the borehole.

77. The apparatus of claim 51, further comprising means for recording said detector outputs as a function of the azimuthal orientation of the housing within the borehole.

78. The apparatus of claim 51, wherein:

said first neutron detector is shielded against formation origin neutrons by a high-Z material; and said second and third detectors are shielded against source neutrons transported along the housing by a neutron moderating-absorbing material.

79. The apparatus of claim 51, further comprising means for combining the outputs of said first, second, and third detectors to derive an indication of at least one of the porosity, density and lithology of or the presence of gas in the surrounding earth formation.

80. The apparatus of claim 79, wherein:

said third detector comprises a neutron detector;

said first and third detector outputs are combined to derive a measurement of at least one of the high energy neutron slowing down length ($L_h$) and the low-energy neutron slowing down length ($L_{epi}$);

the lengthwise spacing between the second detector and the accelerator is substantially twice the low-energy neutron slowing down length ($L_{epi}$);

said first and second detector outputs are combined to derive a measurement of hydrogen index; and said at least one $L_h$ measurement or $L_{epi}$ measurement and said hydrogen index measurement are cross plotted to obtain information of at least one of the porosity and lithology of the surrounding earth formation.

81. The apparatus of claim 79, wherein:

said third detector comprises a neutron detector;

the lengthwise spacing between said second detector and the accelerator is substantially twice the low-energy neutron slowing down length ($L_{epi}$);

the outputs of the second and third detectors normalized by the output of the first detector; and the normalized outputs of the second and third detectors are cross plotted by said combining means to provide information of at least one of porosity, lithology and the presence of gas in the surrounding earth formation.

82. The apparatus of claim 79, wherein the output combining means combines said first detector output with the outputs of said second detector and said third detector by normalizing the outputs of said second and third detectors with said first detector output.

83. The apparatus of claim 82, wherein the combining means combines the normalized outputs of said second and third detectors by cross plotting said normalized outputs.

84. The apparatus of claim 83, wherein said combining means, in accordance with a first predetermined empirical relationship, derives a value of the hydrogen index form the normalized detector output and, in accordance with a second predetermined empirical relationship, derives a value of the neutron slowing down length from the normalized third detector output and said valued of the hydrogen index.

85. A method for measuring properties of earth formations surrounding a borehole, comprising:

providing a high energy neutron accelerator for irradiating the earth formations from within the borehole;

providing a first neutron detector at a first spacing from the accelerator in the lengthwise direction of the borehole, said first neutron detector having an output that is primarily proportional to the accelerator neutron flux;

providing a second neutron detector at a second, farther spacing from the accelerator in the lengthwise direction of the borehole, said second neutron detector being sensitive to epithermal neutrons and having an output that is primarily responsive to the hydrogen concentration of the surrounding earth formation and only secondarily responsive to the density of the surrounding earth formation;

providing a third radiation detector at a third, still farther spacing from the accelerator in the lengthwise direction of the borehole, said third detector having an output that is more responsive to the density of the surrounding earth formation and less responsive to the hydrogen concentration of the surrounding earth formation than is said second detector; and

*combining the outputs of said first, second, and third detectors to derive an indication of at least density of the surrounding earth formation.*

*86. The method of claim 85, wherein said combining step comprising combining said first detector output with the outputs of said second detector and said third detector by normalizing the outputs of said second and third detectors with said first detector output.*

*87. The method of claim 86, wherein said combining step further comprises cross plotting the normalized outputs of said second and third detectors.*

*88. The method of claim 87, wherein the normalized outputs cross plotted are inverse normalized outputs.*

*89. The method of claim 40, wherein said combining step, in accordance with a first predetermined empirical relationship, derives a value of the hydrogen index from the normalized second detector output and, in accordance with a second predetermined empirical relationship, derives a value of the neutron slowing down length from the normalized third detector output and said value of the hydrogen index.*

*90. The method of claim 89, wherein said combining step further comprises combining said hydrogen index value and said slowing down length value to obtain information of at least one of porosity, lithology, and the presence of gas in the surrounding earth formation.*

*91. The method of claim 85, wherein:*

*said third detector comprises a neutron detector;*

*said first and third detector outputs are combined to derive a measurement of at least one of the high energy neutron slowing down length ($L_h$) and the low-energy slowing down length ($L_{epi}$);*

*the lengthwise spacing between the second detector and the accelerator is substantially twice the low-energy neutron slowing down length ($L_{epi}$);*

*the first and second detector outputs are combined to derive a measurement of hydrogen index; and*

*said at least one $L_h$ measurement or $L_{epi}$ measurement and said hydrogen index measurement are cross plotted to obtain information of at least one of the porosity and lithology of the surrounding earth formation.*

*92. The method of claim 85, wherein:*

*said third detector comprises a neutron detector;*

*the lengthwise spacing between said second detector and the accelerator is substantially twice the low-energy neutron slowing down length ($L_{epi}$);*

*the outputs of the second and third detectors are normalized by the output of the first detector; and*

*the normalized outputs of the second and third detectors are cross plotted to provide information of at least one of porosity, lithology and the presence of gas in the surrounding earth formation.*

*93. The method of claim 85, wherein the combining step comprises:*

*combining the normalized outputs of said second and third detectors to derive values of the hydrogen index and the high-energy neutron slowing down length ($L_h$) or the low-energy neutron slowing down length ($L_{epi}$) for the surrounding earth formation; and*

*combining said values of the hydrogen index and ($L_h$) or ($L_{epi}$) in accordance with a predetermined relationship relating changes in the measured valued of ($L_h$) or ($L_{epi}$) to changes in bulk density for a calibration formation of known bulk density, hydrogen index and elemental composition, to obtain information of the bulk density of the surrounding earth formation.*

*94. The method of claim 85, wherein the combining step comprises:*

*determining the hydrogen index and the neutron slowing down length of the surrounding earth formation;*

*determining the difference between said slowing down length and the neutron slowing down length and the neutron slowing down length of a calibration formation of substantially the same hydrogen index and known bulk density; and*

*combining said neutron slowing down time difference with the density-slowing down length sensitivity ration for the calibration formation to obtain a measurement of the bulk density of the surrounding earth formation.*

*95. An apparatus for measuring properties of earth formations surrounding a borehole, comprising:*

*a housing;*

*a neutron accelerator in said housing for irradiating the surrounding earth formations with high energy neutrons;*

*at least one radiation detector in said housing spaced from the accelerator in the lengthwise direction of the housing for detecting radiation resulting from said neutron irradiation and generating an output in response to said detected radiation, the spacing being such that the radiation resulting from said neutron irradiation is influenced by the density of the formations; and*

*means for recording the output of said at least one detector as a function of at least one of borehole depth and azimuthal orientation within the borehole and means for determining a parameter related to the density of the earth formation.*

*96. A method for measuring the properties of earth formations surrounding a borehole, comprising:*

*providing a neutron accelerator for irradiating the earth formations with high energy neutrons from within the borehole;*

*providing at least one radiation detector spaced from the accelerator in the lengthwise direction of the borehole for detecting radiation resulting from said neutron irradiation of the earth formations and for generating an output response to said detected radiation, the spacing being such that the radiation resulting from said neutron irradiation is influenced by the density of the formations; and*

*recording the output of said at least one detector as a function of at least one of borehole depth and azimuthal orientation in the borehole and determining a parameter related to the density of the earth formation.*

* * * * *